United States Patent [19]

Hosom et al.

[11] Patent Number: 5,577,160

[45] Date of Patent: Nov. 19, 1996

[54] SPEECH ANALYSIS APPARATUS FOR EXTRACTING GLOTTAL SOURCE PARAMETERS AND FORMANT PARAMETERS

[75] Inventors: John-Paul Hosom; Mikio Yamaguchi, both of Osaka, Japan

[73] Assignee: Sumitomo Electric Industries, Inc., Osaka, Japan

[21] Appl. No.: 81,674

[22] Filed: Jun. 23, 1993

[30] Foreign Application Priority Data

Jun. 24, 1992 [JP] Japan .................................... 4-166394
Jun. 4, 1993 [JP] Japan .................................... 5-134562

[51] Int. Cl.$^6$ ................................ G01L 3/02; G01L 9/00
[52] U.S. Cl. ........................ 395/218; 395/2.14; 395/2.15; 395/2.28
[58] Field of Search ............................. 395/2, 2.19, 2.18, 395/2.28, 2.29, 2.14, 2.15, 2.7

[56] References Cited

U.S. PATENT DOCUMENTS

| | | | |
|---|---|---|---|
| 3,649,765 | 3/1972 | Rabiner et al. | 395/2.18 |
| 4,142,067 | 2/1979 | Williamson | 381/41 |
| 4,922,539 | 5/1990 | Rajasekaran et al. | 381/50 |

OTHER PUBLICATIONS

A New Glottal LPC Method for Voice Coding and Filtering ALKU et al. IEEE/May 1990.
Low Bit Rate Speech Coding with Glottal Linear Prediction ALKU, IEEE/May 1990.
Evaluation of a Glottal Arma Model of Speech Production Lobo et al. IEEE/ Mar. 1992.
Excitation Synchronous Formant Analysis Wood et al. IEEE/ Apr. 1989.
Veth et al., "Robust ARMA Analysis as an aid in developing parameter control rules for a pole–zero cascade speech synthesizer", 1990 International conference on Acoustics, Speech, and Signal processing (ICASSP 90), pp. 305–308 vol. 1.
A Comparison of EEG and a New Automatic Inverse Filtering Method in Phonation Change from Breathy to Normal By Paavo Alku, Errki Vilkman and Unto K. Laine.
Fundamentals of Speech Signal Processing by Shuzo Saito and Kazuo Nakata, Nov. 30, 1981.
"A New Model for the Glottal Source Waveform and its Application to Speech Analysis" by Hiroya Fujisaki and Mats Ljungqvist, *Electronic Telecommunication,* vol. J72-D-II No. 8, pp. 1109–1117, 1989.
"Comparison of Errors in Formant Frequencies Obtained by Various Methods of Formant Extraction" by Hiroya Fujisaki and Yasuo Sato (Faculty of Engineering, University of Tokyo) Dec. 18, 1973.

*Primary Examiner*—Allen R. MacDonald
*Assistant Examiner*—Richemond Dorvil
*Attorney, Agent, or Firm*—Morgan & Finnegan, L.L.P.

[57] ABSTRACT

An LPC analysis of a voice waveform is performed by an LPC analyzing circuit before analyzing vocal tract parameters by a vocal tract parameter analyzing circuit. The result of the analysis is converted into the components of source parameters by converting circuits and to eliminate the component of the source parameters from the voice waveform by an inverse filter. The components of the vocal tract parameters obtained by the analysis in the vocal tract parameter analyzing circuit is eliminated from the voice waveform through an inverse filter.

2 Claims, 31 Drawing Sheets

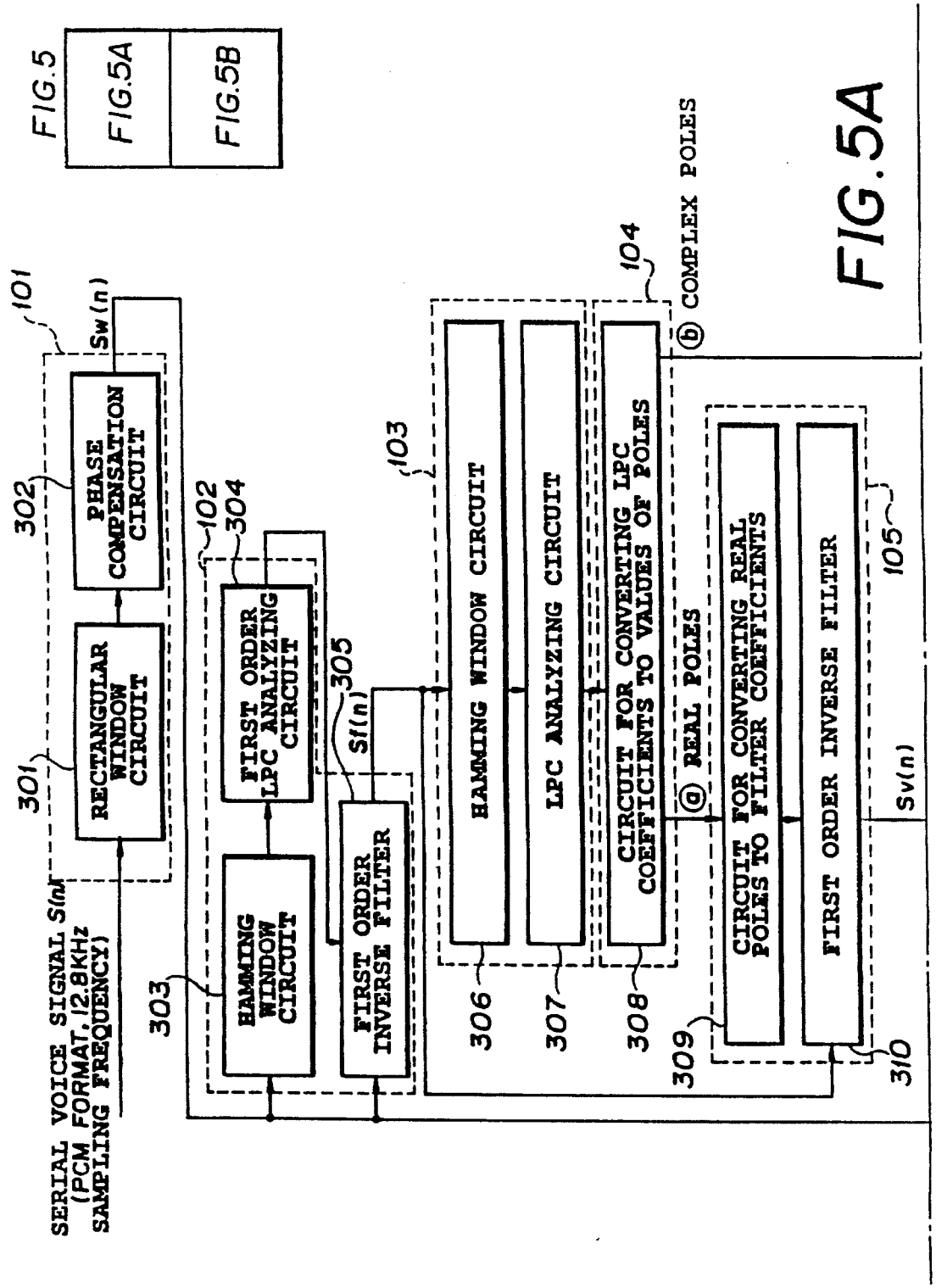

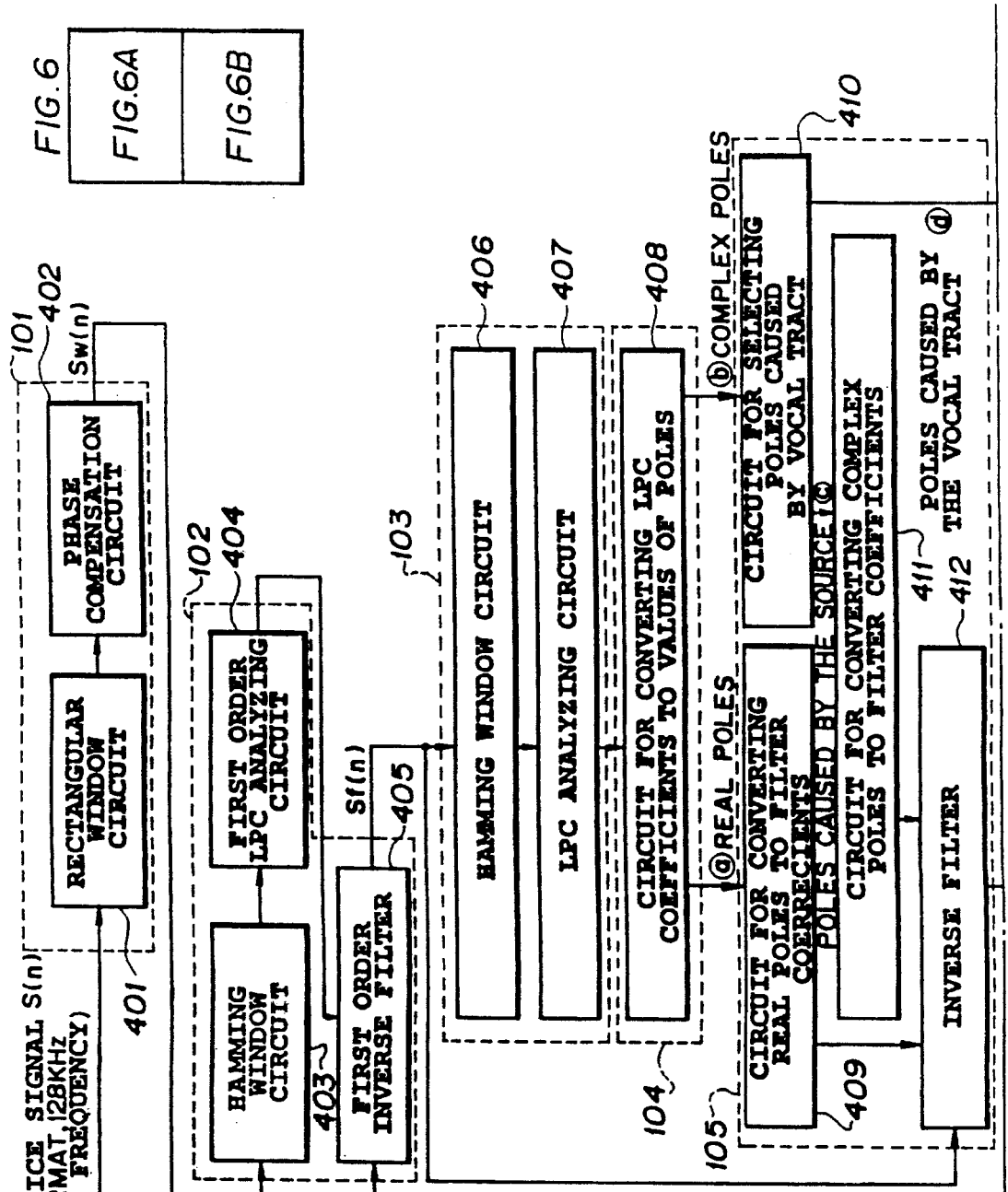

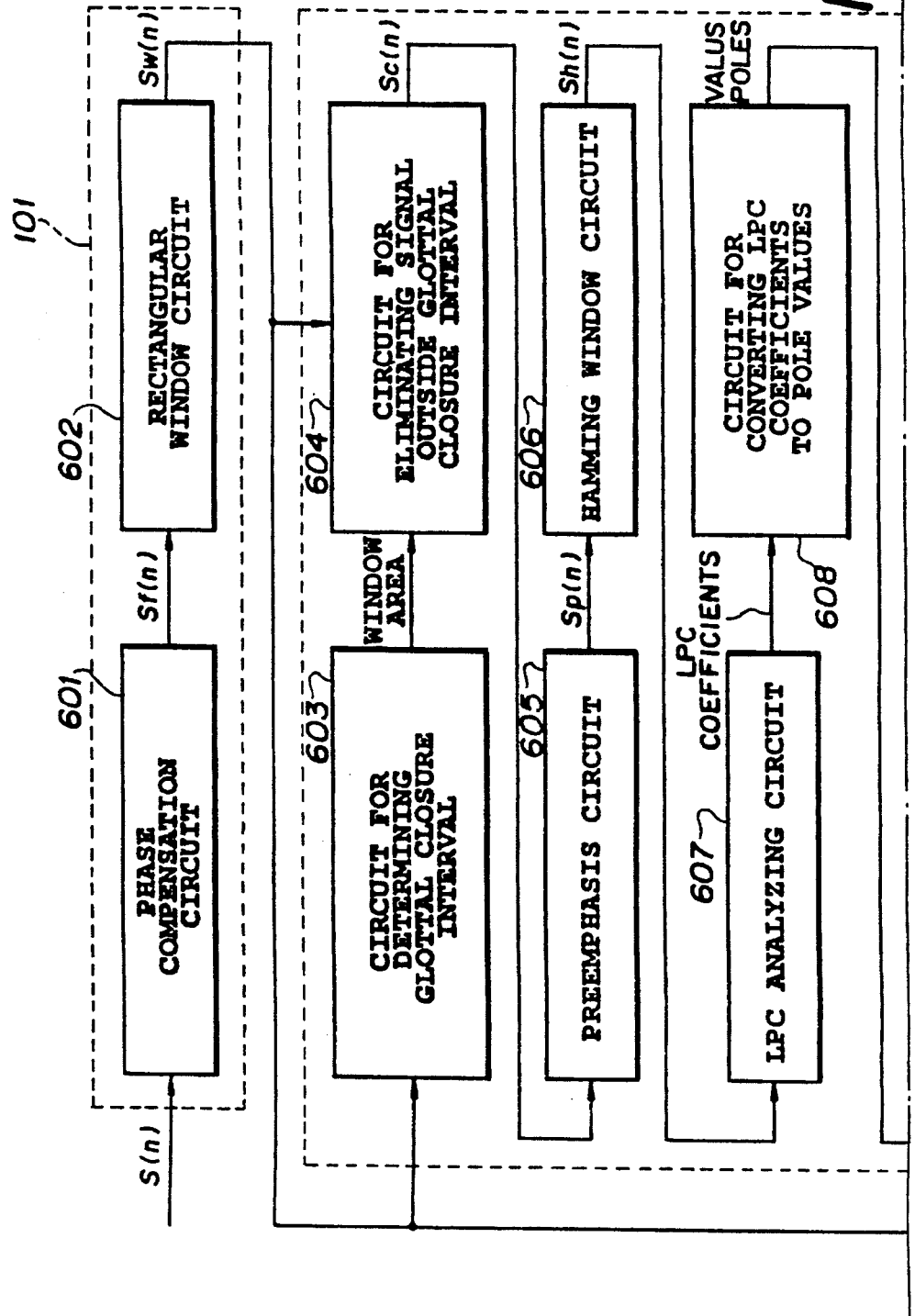

| | VALUE OF PARAMETER USED IN SYNTHETIC SPEECH | RESULT (AND ERROR) FROM PRIOR ART | RESULT (AND ERROR) FROM THE INVENTION |
|---|---|---|---|
| F1 | 350.00 | 485.46(+135.46) | 355.46(+5.46) |
| OQ | 0.526 | 0.450(-0.076) | 0.500(-0.026) |
| SK | 0.150 | 0.225(+0.075) | 0.163(+0.013) |
| C | 0.821 | 0.900(+0.079) | 0.900(+0.079) |
| D | 0.403 | 0.248(-0.155) | 0.210(-0.193) |

FIG.19

|  | VALUE OF PARAMETER USED IN SYNTHETIC SPEECH | RESULT (AND ERROR) FROM PRIOR ART | RESULT (AND ERROR) FROM THE INVENTION |
|---|---|---|---|
| F1 | 500.00 | 652.49 (+152.49) | 582.49 (+82.49) |
| OQ | 0.812 | 0.775 (-0.037) | 0.788 (-0.024) |
| SK | 0.386 | 0.450 (+0.064) | 0.438 (+0.052) |
| C | 0.138 | 0.775 (+0.637) | 0.900 (+0.762) |
| D | 0.014 | 0.060 (+0.046) | 0.060 (+0.046) |

FIG. 20

| | VALUE OF PARAMETER USED IN SYNTHETIC SPEECH | RESULT (AND ERROR) FROM PRIOR ART | RESULT (AND ERROR) FROM THE INVENTION |
|---|---|---|---|
| F1 | 900.00 | 725.85(-174.15) | 1005.85(+105.85) |
| OQ | 0.452 | 0.850(+0.398) | 0.650(+0.198) |
| SK | 0.405 | 0.550(+0.145) | 0.538(+0.133) |
| C | 0.574 | 0.000(-0.574) | 0.875(+0.301) |
| D | 0.168 | 0.010(-0.158) | 0.048(-0.120) |

FIG. 21

SPEECH ANALYSIS APPARATUS FOR EXTRACTING GLOTTAL SOURCE PARAMETERS AND FORMANT PARAMETERS

BACKGROUND OF THE INVENTION

1. Field of the Invention

The present invention relates to a speech analysis apparatus for estimating precise values of glottal parameters (source parameters) and vocal tract parameters from an input voice signal.

2. Description of the Prior Art

In the prior art, when the voice signal is analyzed, characteristic parameters are extracted from the voice signal. These characteristic parameters are, for example, the vocal tract parameters in the form of formant frequencies and the voiced sound source parameters. A plurality of peaks in the spectrum envelope which characterizes vowels in the voice signal are called formants, each of which is numbered No. 1, No. 2, . . . , in order of increasing frequency. A sound source is an energy source of a voice waveform and the voiced sound source and a voiceless sound source are known. In a voice synthesizer which simulates the speech organs of humans, vocal tract characteristics and radiation characteristics are added to a voiced sound wave which is outputted from the voiced sound source. A voiced sound waveform emitted from the glottis is called the glottal wave and the effect added to the glottal wave between the glottis and the mouth is called the vocal tract characteristic. The effect added when the voice is emitted from lips is called as radiation characteristic. For extracting the characteristic parameters of the sound source from the voice signal to which the characteristics as mentioned above have been added, a speech analysis method called as Adaptive Inverse Filtering (AIF) method is known. This method is described in, for example, "A Comparison of EGG and a New Automatic Inverse Filtering Method in Phonation Change from Breathy to Normal" ICSLP-90 (1990 International Conference on Spoken Language Processing) Proceedings, 6.9.1 pp. 197–202 (1990). The AIF method is a technique which will be explained hereinafter and a circuit arrangement of the speech analysis apparatus using this method is shown in FIG. 1. A signal s(n) to be analyzed is processed through a Hamming window, and then filtered by high-pass filter means 201 to produce a signal sh(n). The high-pass filter means 201 is a filter for eliminating data which causes gradual rising or falling of the output signal. First order LPC (Linear Predictive Coding) analysis means 202 which inputs the sh(n) signal performs analysis by using the LPC in which predicting order is 1. The signal sh(n) is inverse filtered by an inverse-filter 203 using the result of the analysis carried out by the first order LPC analysis means 202 to produce a signal sv(n) with only the effect of the vocal tract. The signal sv(n) is analyzed by a high order LPC analysis means 204 which analyzes by using high prediction order of LPC, and then the signal sh(n) is inverse filtered by an inverse-filter 205 using the result of the analysis to produce a signal sgr(n) with only the effects of the sound source and the radiation characteristics. If necessary, the signal sgr(n) is integrated by an integrator 206 to produce the source waveform alone. Then, the source parameters are also extracted from the signal sgr(n) by extracting means 207.

In the prior art apparatus of this type, because the signal is inverse filtered as it is, regardless of the number of formants, the result of the analysis is inaccurate. It will be explained in more detail hereinafter.

If the high prediction order of the high order LPC analysis means 204 is twice the expected number of poles, vocal tract components can be eliminated mainly in the inverse filter 205. However, since the LPC prediction order used for expressing the source characteristics is only first order (the processing of the first order analysis means 202), the extraction of the source waveform becomes inaccurate. Namely, when the source characteristics estimated by the first order LPC prediction is expressed as shown in FIG. 2, as compared to, for example, fifth order LPC prediction shown in FIG. 3, the extraction parts of particularly the lower frequencies can be seen to be inaccurate. On the other hand, if the high prediction order is larger than twice the expected number of poles, the inverse filter 205 will eliminate not only the glottal components but also vocal tract components, because the results of the LPC include both glottal and source components. Furthermore, when the LPC analysis method is used in the AIF method, estimation of the pole frequency and bandwidth is not as accurate as estimation by other methods such as AbS (Analysis-by-synthesis).

SUMMARY OF THE INVENTION

The first objective of the present invention is to make accuracy of the source parameter obtained by the results of the analysis superior to the prior art.

The second objective of the present invention is to make accuracy of the vocal tract parameters superior to the prior art, which will in turn increase the accuracy of the extracted source parameters.

In a first aspect of the present invention, there is provided a speech analysis apparatus wherein components of vocal tract parameters and source parameters are extracted from a voice waveform, the apparatus comprising:

an inverse filter for eliminating the components of the source parameters from the voice waveform, when the speech analysis of the vocal tract parameters is performed; and an inverse filter for eliminating the components of the vocal tract parameters from the voice waveform, when the speech analyses of the source parameters is performed.

Here, a speech analysis apparatus may further comprise an analyzing circuit for obtaining the component of the source parameters by performing the speech analysis on the voice waveform, with an analysis manner different from the analysis of the source parameters, whereby the source parameters obtained by the analyzing circuit is utilized to eliminate the source parameters from the voice waveform.

The voice analysis of the source parameters may be an AbS analysis, and the voice analysis by the analyzing circuit may be an LPC analysis.

The speech analysis apparatus may further comprise a circuit for picking up a voice signal with a limited time length from a serial voice signal, whereby the voice waveform of the voice signal with a limited time length is utilized for the speech analysis.

The speech analysis apparatus may further comprise a circuit for performing a phase compensation on either one of the voice waveform and the voice waveform of the voice signal with a limited time length.

In a second aspect of the present invention, there is provided a speech analysis apparatus wherein components of a vocal tract parameter and source parameters are extracted from a voice waveform, the apparatus comprising;

an eliminating circuit for eliminating formant components except a first formant component among a plurality of formant components which form the components of the vocal tract parameters; and a separating circuit for separating the source parameter and the first formant component using voice signal after the eliminating processing.

Here, the circuit for separating may include;

a circuit for extracting directly the first formant component from the voice waveform;

a circuit for making a plurality of candidates of the first formant by using the extracted first formant component, each of the candidates having different values;

a circuit for eliminating each of the candidates of the first formant from the voice signal after the eliminating processing;

a generator for generating a plurality of candidates of the source waveform whose source parameters are apparent;

a detector for detecting from the source waveforms generated a candidate of the waveform most similar to the waveform of the voice signal from which the candidate of the first formant is eliminated; and a circuit for determining as a result of the circuit for separating the candidates of the first formant and the source parameter corresponding to said detected candidate of the source waveform.

A speech analysis apparatus may further comprise a circuit for extracting a plurality of formant components which form the component of the vocal tract parameters from the voice waveform, whereby the circuit for extracting supplies the first formant component among the plurality of the extracted formant components to the circuit for separating, and supplying the formant components except the first formant component to the circuit for eliminating.

The speech analysis apparatus may further comprise:

a circuit for extracting a plurality of formant components from the voice waveform;, and a circuit for supplying the formant components except the first formant component included in a plurality of the extracted formant components to the eliminating circuit.

The speech analysis apparatus may further comprise a circuit for eliminating the wave outside a glottal closure period from the voice waveform before extracting the plurality of the formant components.

The speech analysis apparatus may further comprise a circuit for picking up a voice signal with a limited time length from a serial voice signal, whereby the voice waveform of the voice signal with a limited time length is utilized for the speech analysis.

The speech analysis apparatus may further comprise circuit for performing a phase compensation on either one of the voice waveform and the voice waveform of the voice signal with a limited time length.

The inventors found that, in speech analysis of each source and vocal tract parameters by the conventional AIF method, the parameter component to be analyzed (source parameters) and other parameter components (formants) exist with mixture in the voice signal to be analyzed. On the basis of the above knowledge, in the first claim of the present invention, by eliminating other parameters except the ones to be extracted from the voice waveform to be analyzed, analysis becomes more accurate than with the prior art.

In the second and the third claims of the invention, the source parameter components obtained by LPC analysis are eliminated from a speech waveform, and then the vocal tract parameter components are obtained by an AbS analysis. Therefore, the vocal tract parameters obtained by the AbS analysis can be used as the vocal tract parameters to be eliminated from the voice waveform in the analysis of the source parameter and it is unnecessary to determine again vocal tract parameters for the analysis of the source parameter.

In the fourth and the eleventh claims of the invention, a part of the object to be analyzed, e.g. vowels, are extracted so that the analysis of the parameters can be done.

In the fifth and the twelfth claims of the invention, the speech analysis is performed after phase compensation of the voice waveform so that the analysis accuracy is further improved. Furthermore, the inventors found that the first formant whose frequency is lowest in a plurality of formants used as the vocal tract parameters has a great effect on extraction of the source parameters.

On the basis of this new knowledge, in the sixth claim of the present invention, formant components which have small effect of the source are eliminated first from the voice waveform, thereby the effect on the first formant component and the source parameter component of the voice waveform during an eliminating process are decreased.

In the seventh claim of the present invention, the source candidate that is most similar to the source waveform from which all formant components have been eliminated is selected, the source parameters of the source candidate being known, so that the analysis accuracy is improved In the eighth and the ninth claims of the invention, all formant components are extracted, and a formant component is supplied selectively so that it is unnecessary to extract individually a formant component from the voice waveform.

In the tenth claim of the present invention, the voice waveform in the glottal closure period is used for the analysis of the vocal tract parameters so that the analysis accuracy of the vocal tract parameters is improved.

The above and other objects, effects, features and advantages of the present invention will become more apparent from the following description of embodiments thereof taken in conjunction with the accompanying drawings.

BRIEF DESCRIPTION OF THE DRAWINGS

FIG. 5A is a block diagram showing one partial arrangement of a specific circuit according to the embodiment in FIG. 4;

FIG. 6A is a block diagram showing one other partial arrangement of the circuit according to the embodiment in FIG. 4;

FIG. 14A is a block diagram showing one partial arrangement; of a circuit according to the embodiment in FIG. 13;

FIG. 19 is a diagram showing correct values and error in the analysis for both the prior art and the present invention;

FIG. 20 is a diagram showing other correct values and error in the analysis for both the prior art and the present invention;

FIG. 21 is a diagram showing further correct values and error in the analysis for both the prior art and the present invention;

DETAILED DESCRIPTION OF THE PREFERRED EMBODIMENTS

Figure 4:
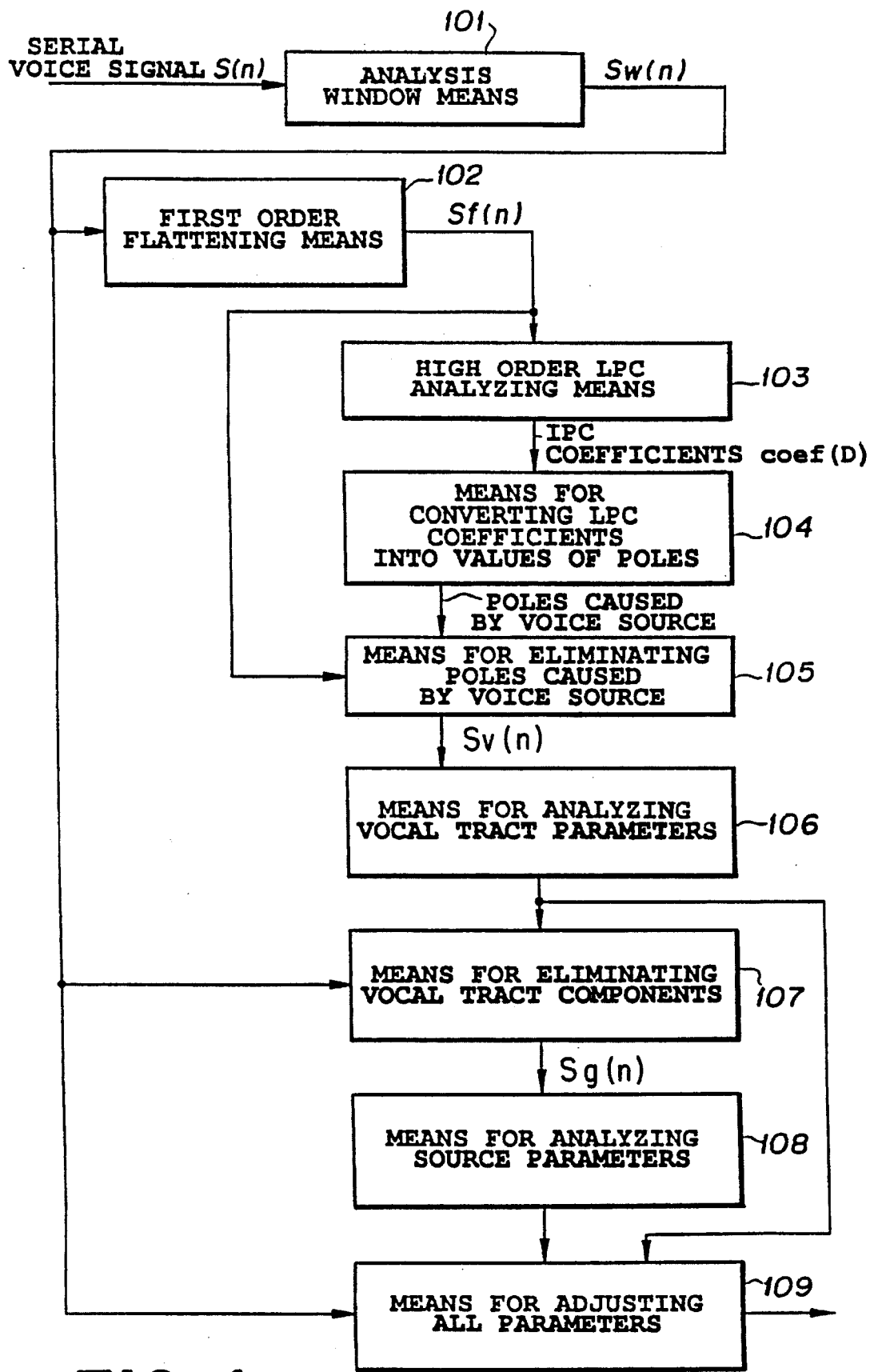
FIG. 4 is a block diagram showing the fundamental arrangement of one embodiment of the claim of the present invention.

One embodiment of the first claim of the present invention will be explained hereinafter. FIG. 4 shows a fundamental arrangement of this first embodiment.

Figure 1:
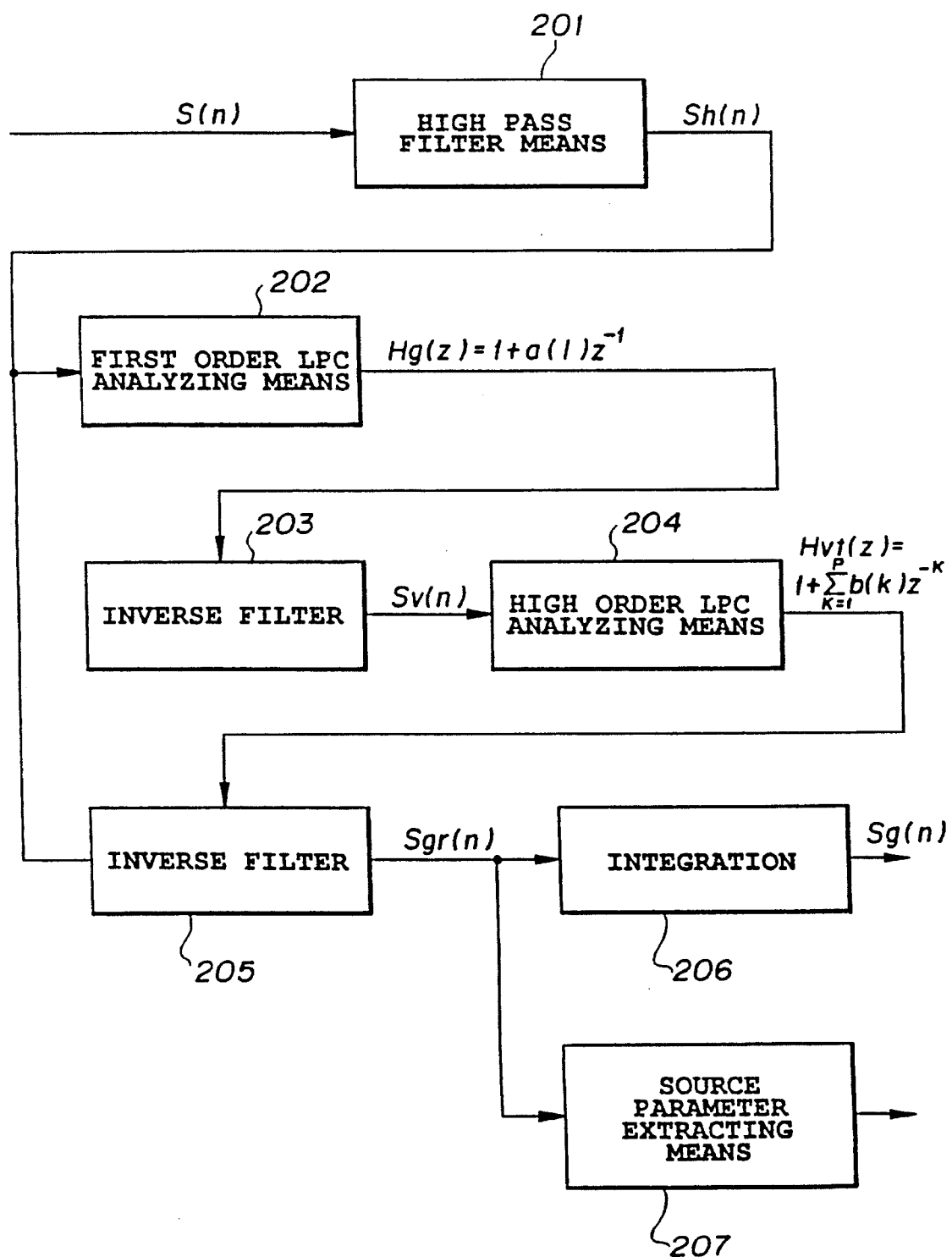
FIG. 1 is a block diagram showing the major part of one example of the speech analysis apparatus in the prior art.
Figure 2:
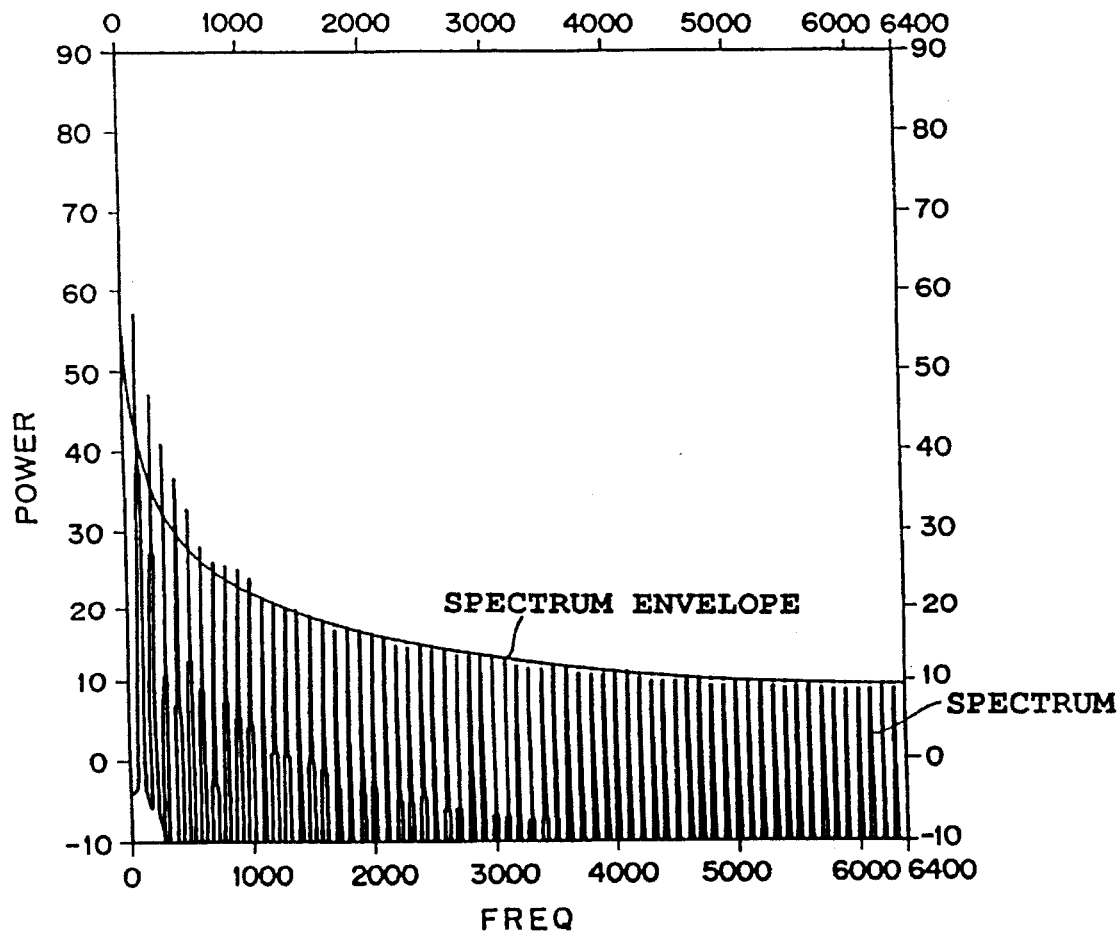
FIG. 2 is a characteristics diagram illustrating the spectrum of a sound source model and an envelope of the spectrum obtained by using a conventional LPC analysis method in which a prediction order is 1.
Figure 3:
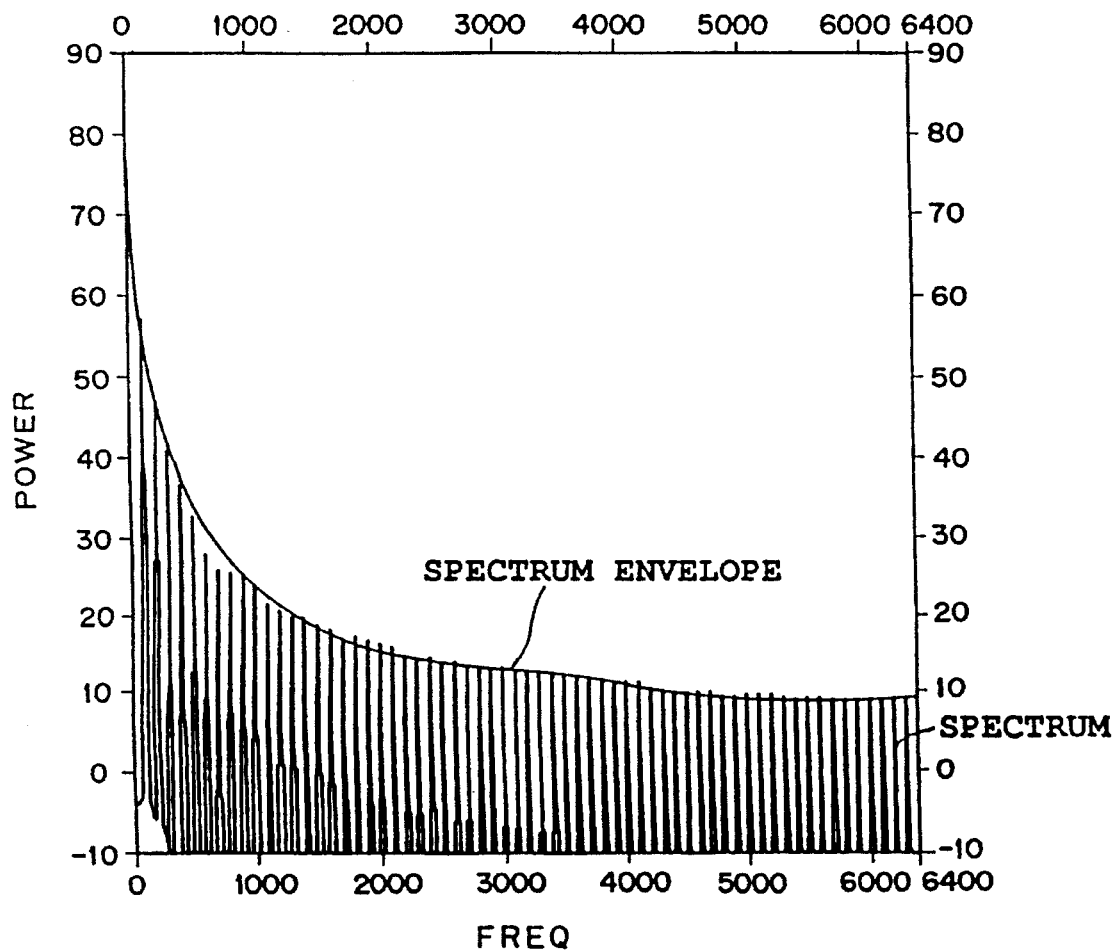
FIG. 3 is a characteristics diagram illustrating the spectrum of the same sound source model as in FIG. 2 and the envelope of the spectrum obtained by using the LPC analysis method in which the prediction order is 5.

An input signal is passed through a window function by means 101 and is then made spectrally flat by first order pre-emphasis means in the same way as the prior technique, the AIF method, shown in FIG. 1. A signal sf(n) is analyzed by a high order LPC analysis means 103 in the same way as the above AIF method. However, in this embodiment, LPC coefficients which are output of the high order LPC analysis means 103 are converted into values of parameters of poles by means 104 for converting the LPC coefficients into the values of the poles.

A pole which models the effects of the sound source which is outputted from the means for converting the LPC coefficients into the values of the poles 104 is inputted into means 105 for eliminating the pole which models the effect of the sound source, wherein the pole which models the effect of the sound source is eliminated from the preemphasized signal sf(n). An output of the eliminating means 105 for eliminating the pole which models the effect of sound source is a signal sv(n) with only the effect of the vocal tract characteristics of a voice signal.

The signal sv(n) is precisely analyzed by means 106 for analyzing vocal tract parameters to extract the value of the glottal parameter. The values of the vocal tract parameters are inputted into means 107 for eliminating the effect of the vocal tract parameters from the signal sw(n) (corresponding to means for eliminating a component of the vocal tract parameters in claim 1), wherein a signal sg(n) with only the effects of the sound source and radiation characteristics is produced.

The signal sg(n) is inputted into means 108 for analyzing the source parameters to extract the values of the source parameter by this means. Finally, the source parameters and the vocal tract parameters are inputted into means 109 for adjusting all of the parameters by using the signal sw(n) to extract the precise source parameters and vocal tract parameters by this means.

When starting up the speech analysis apparatus as constructed above, the source parameters and the vocal tract parameters can be extracted in accordance with the following process.

In the analysis window means 101 the time range of the input signal s(n) is set to produce the signal sw(n). The signal sw(n) is then preemphasized by the means 102 for first-order flattening of the spectrum to produce a signal sf(n). The signal sf(n) is analyzed by the high order LPC analysis means 103 to extract the LPC coefficients which include the effects of the vocal tract characteristics and the effects relevant to the sound source which are not precisely modeled by first-order flattening of the spectrum.

The LPC coefficients are inputted into the means 104 for converting LPC coefficients to values of the poles, to determine the poles which model the effects of the sound source and the poles which model the vocal tract characteristics and to output then separately. The values of the poles which model the effects of the sound source are inputted into the means 105, for eliminating the poles which model the effects of the sound source in which the value of pole is converted into the coefficient of a filter. Then, the signal sf(n) is inverse filtered with the resultant coefficients to produce the signal sv(n).

The signal sv(n) is analyzed by the means 106 for analyzing the vocal tract parameters to extract the values of the vocal tract parameters. These values are inputted into the means 107 for eliminating components of the vocal tract parameters, in which the values of these parameters are converted into the coefficients of filters. Then, the signal sw(n) is inverse filtered with the resultant coefficients to produce a signal sg(n).

The signal sg(n) with only the effects of the sound source and the radiation characteristic is inputted into the means 108 for analyzing the source parameters to extract the value of the parameters of the source model. Next, the values obtained from means 106 for analyzing the vocal tract parameters and the values obtained from means 108 for analyzing the source parameters are adjusted by means 109 for adjusting all of the parameters to output the accurate vocal tract parameters and the accurate source parameters.

Figure 5B:
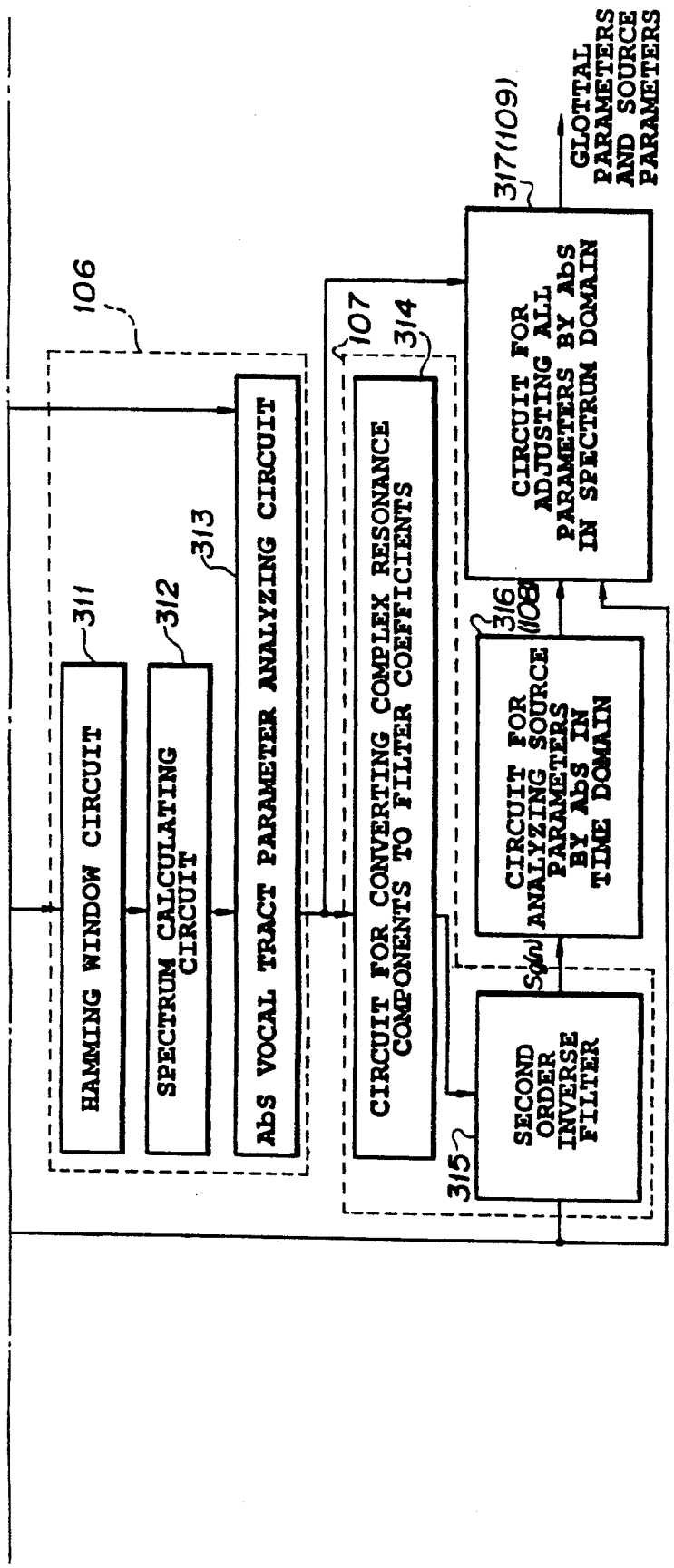
FIG. 5B is a block diagram showing another partial arrangement of the specific circuit according to the embodiment in FIG. 4.

FIGS. 5A and 5B show another specific embodiment of the speech analysis apparatus of FIG. 4. In FIGS. 5A and 5B, the portions designated by dotted blocks correspond to circuit blocks shown in FIG. 4 and the dotted blocks are designated with the same numerals as the numerals in FIG. 4. The numeral in parenthesis designates the block directly corresponding to one in FIG. 4.

In FIG. 5A, the serial voice signal s(n) which is inputted from outside in a form of 12.8 KHz sampling frequency and PCM (Pulse Code Modulation) format is restricted to a limited range of time by a rectangular window-circuit 301 (corresponding to the circuit for extracting a voice signal with a limited time length in claim 4), and has the phase distortion in a recorder compensated for a phase compensation filter (corresponding to the circuit for phase compensation in claim 5) to produce a voice signal sw(n). The voice signal sw(n) is processed by a Hamming window circuit 303, and then the spectral filt is obtained by the first order LPC analysis circuit 304.

The voice signal sw(n) is filtered by a first order inverse filter 305 using one LPC coefficient obtained from the first order LPC analysis circuit 304 to produce a voice signal sf(n).

The voice signal sf(n) is processed by a Hamming window circuit 306, and analyzed by an LPC analysis circuit 307 in which the prediction order is 14 (in the case of a male voice). The results of the analysis are converted into the values of parameters of complex poles (the poles that model the vocal tract) and real poles (the poles that model the effect of the source) by using means 308 for converting LPC coefficients into values of poles.

The real poles alone are inputted through a channel $\bar{a}$ into a circuit 309 for converting the real poles into the coefficients of a filter, in which the filter coefficients are calculated. The voice signal sf(n) is inverse filtered with all of the filter coefficients using a first order inverse filter 310 to produce a voice signal sv(n).

Referring now to FIG. 5B, a voice signal sv(n) is processed by a Hamming window circuit 311, and input into a spectrum calculating circuit 312, in which the power spectrum of the voice signal sv(n) is calculated. The resultant spectrum is then inputted into an AbS vocal tract parameter analysis circuit 313. In order to determine the initial values of the formants of AbS (Analysis by Synthesis), the complex poles obtained from the circuit 308 for converting LPC coefficients to the values of the poles is inputted through a channel $\bar{b}$ into the AbS vocal tract parameter analysis circuit 313. AbS described hereinafter is a method for analyzing multiple parameters of a component system, where parameter candidates are prepared, a model of the system is generated using the said parameter candidates, the error between the data of the system and the model of the system is computed, parameter candidate values are adjusted, and the model-generation, error computation, and parameter adjustment steps are repeated so as to minimize the error and yield the best parameter values.

The vocal tract parameters of the voice signal sv(n) are extracted in the spectral domain by the AbS vocal tract parameter analysis circuit 313. The values of the extracted parameters are converted into the coefficients of filter by a circuit 314 for converting a complex resonance component to the coefficients of a filter.

The three filter coefficients of each parameter are inputted into a second order inverse filter 315, in which the voice signal sw(n) is inverse filtered to produce a voice signal sg(n) with only the sound source and the radiation characteristics.

Figure 6B:
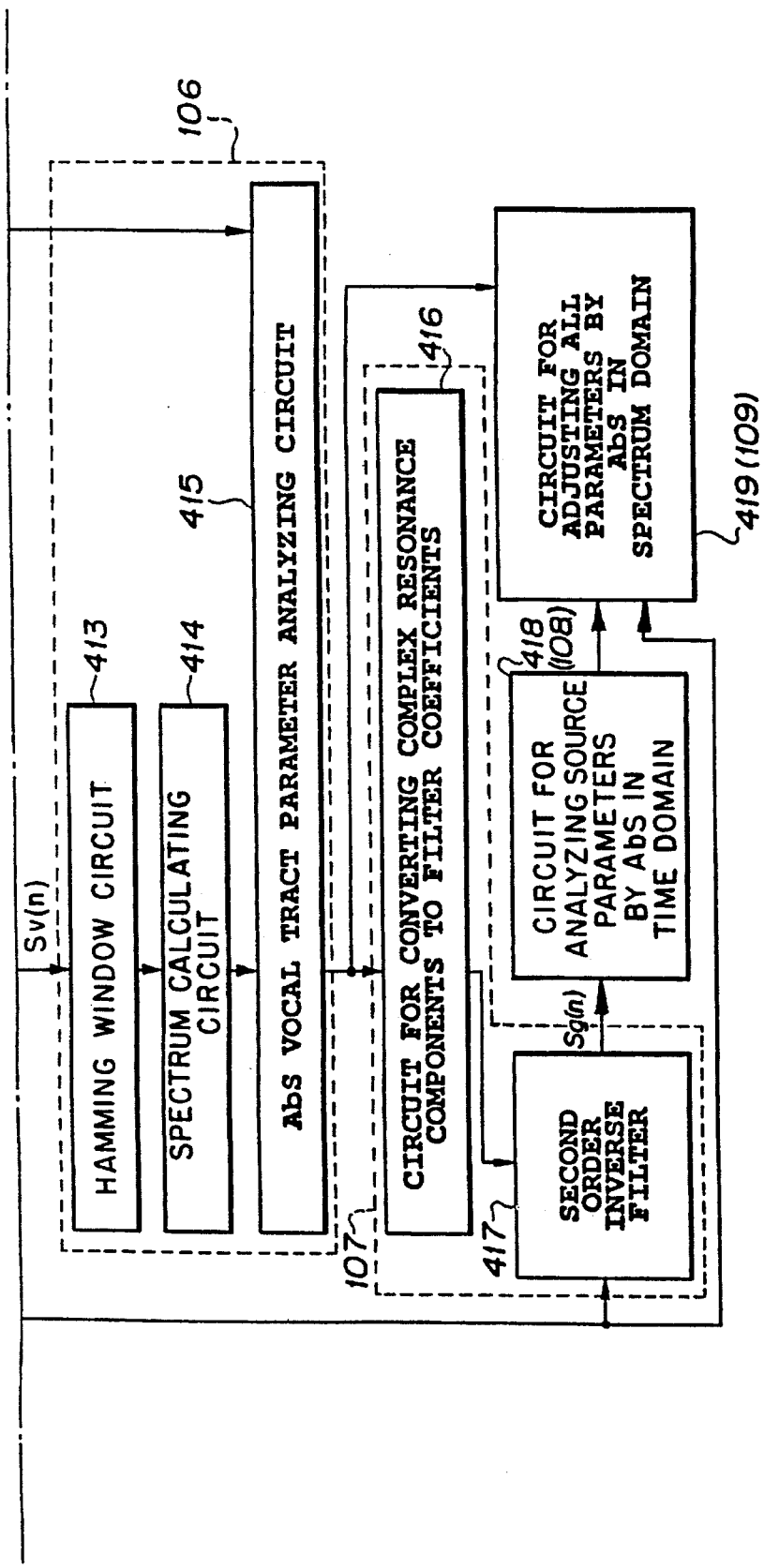
FIG. 6B is a block diagram showing another partial arrangement of the circuit according to the embodiment in FIG. 4.

The value of the source parameters are extracted from the voice signal sg(n) by a source parameter analysis circuit 316 which uses the AbS method in the time domain. The values of the source parameters and the values of the vocal tract parameters obtained by the AbS vocal tract parameter analysis circuit 313 are inputted into a circuit 317 for adjusting all of the parameters using the AbS method in the spectral domain, and in this circuit 317, all of the parameters are adjusted to output the values of the adjusted vocal tract parameters and the values of the adjusted source parameters. It should be appreciated that the arrangement of the circuit shown in FIGS. 5A and 5B can be modified to the arrangement as shown in FIGS. 6A and 6B. In this example, the arrangement of the circuit 105 for eliminating the poles which model the effects of the sound source is different from that of FIG. 6A.

When starting up the speech analysis apparatus constructed as shown in FIGS. 6A and 6B, the source parameter and the vocal tract parameters can be extracted as follows. The serial voice signal s(n) which is inputted in the form of 12.8 KHz sampling frequency and PCM format is restricted to a limited time range by a rectangular window circuit 401, and then the phase distortion caused by a recorder is compensated for by a phase compensation filter 402 to produce a voice signal sw(n). The voice signal sw(n) is processed by a Hamming window circuit 403, and the spectral filt is obtained by the first order LPC circuit 404.

The voice signal sw(n) is filtered with one LPC coefficient obtained from the analysis circuit 404 in a first order inverse filter 405 to produce a voice signal sf(n). The voice signal sf(n) is processed by the Hamming window circuit 406, and analyzed by an LPC analyzing circuit 407 in which the prediction order is more than 14 (in the case of a male voice). The results of analysis are converted into values of parameters of complex poles and the real poles (the poles that model the effect of the sound source) by a circuit 408 for converting the LPC coefficients of the result of the analysis into the values of poles. The real poles alone are inputted through a channel $\bar{a}$ into a circuit 409 for converting the real poles into filter coefficients, in which the filter coefficients are calculated. In the example of FIG. 6A which is different from one of FIG. 5A, the complex poles are separated into the poles which model the vocal tract and the poles which model the effect of the sound source; the poles which model the effect of the sound source are inputted through a channel $\bar{c}$ into a circuit 411 for converting the complex pole into filter coefficients.

The outputs of the circuits 409 for converting the real pole into filter coefficients and the circuit 411 for converting the complex poles into filter coefficients, are inputted into an inverse filter 412 and the voice signal sf(n) is inverse filtered with all of the filter coefficients calculated by the inverse filter 412 to produce a voice signal sv(n).

In the manner similar to the example of FIG. 5, the signal sv(n) is processed by a Hamming window 413, the result of which is inputted into a spectrum calculation circuit 414, and the power spectrum of the voice signal sv(n) is calculated in the calculation circuit 414. The calculated spectrum is inputted to an AbS vocal tract parameter analysis circuit 415 and only the poles obtained from the circuit 410 for selecting poles which model the vocal tract are used as initial values for AbS and are inputted into AbS vocal tract parameter analysis circuit 415 through a channel d̄.

The AbS vocal tract parameter analysis circuit 415 extracts the vocal tract parameters of the voice signal sv(n) in the spectral domain. The values of the extracted parameters are converted into filter coefficients by a circuit 416 for converting from the complex resonance components to filter coefficients. The three filter coefficients of each parameter are inputted into a second order inverse filter 417 and the voice signal sw(n) is inverse filtered to produce a voice signal sg(n) with only the sound source and the radiation characteristics.

The values of the source parameters are extracted from the voice signal sg(n) by a source parameter analysis circuit 418 using the AbS method in the time domain. The values of the source parameters and the values of the vocal tract parameters obtained from the AbS vocal tract parameter analysis circuit 415 are inputted into a circuit 419 for adjusting all of the parameters by the AbS method in the spectral domain, and all of the parameters are adjusted in the circuit 419 for adjusting all of the parameters by the AbS in the spectrum domain using the voice signal sw(n), and adjusted values of the vocal tract parameters and the source parameters are outputted.

Figure 9:
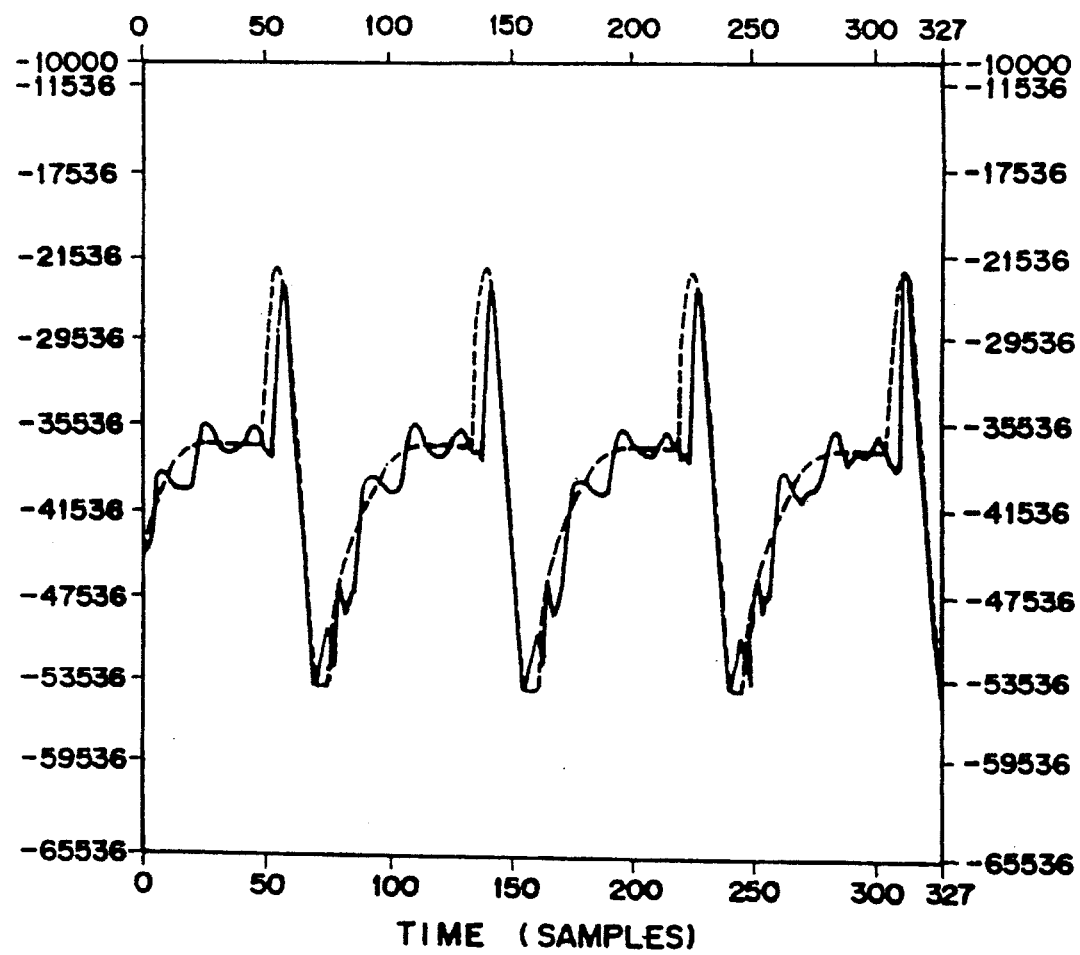
FIG. 9 is a waveform plot showing a waveform of the sound source obtained from the data of FIG. 7 by using the prior art and a waveform of the sound source model.
Figure 10:
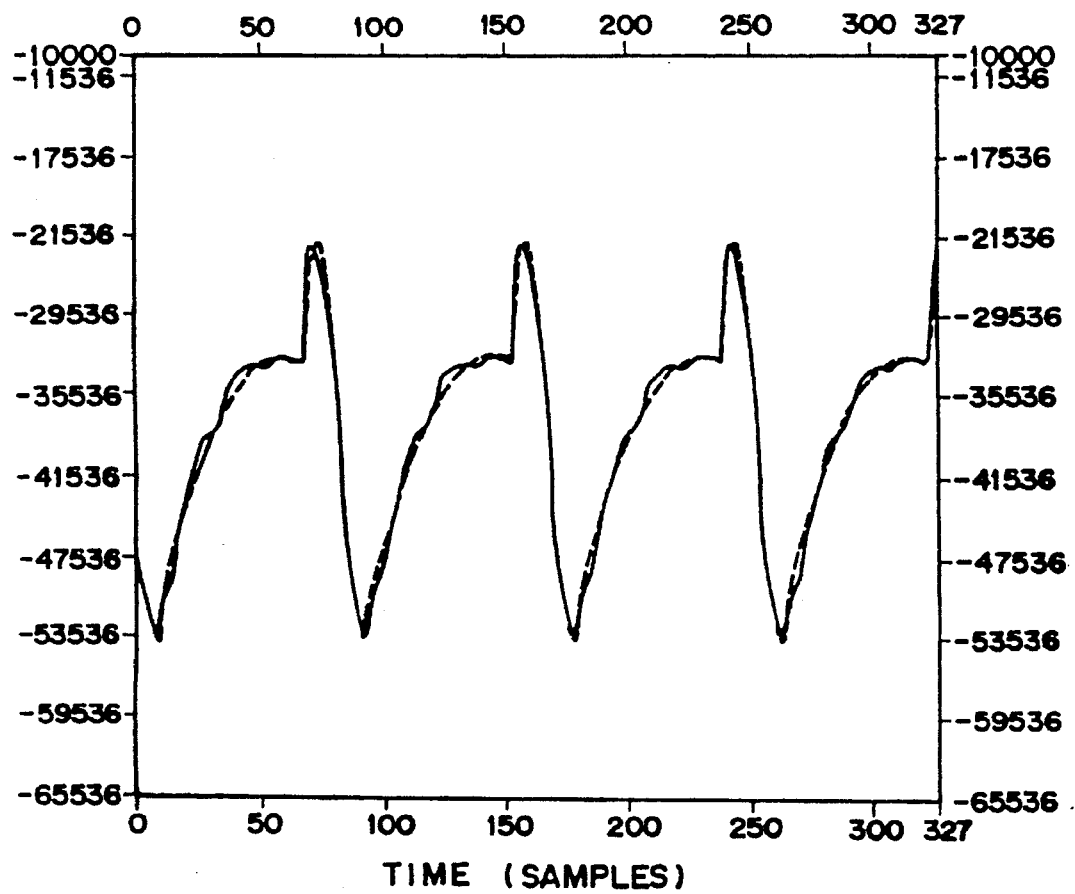
FIG. 10 is a waveform plot showing a waveform of the sound source obtained from the data of FIG. 7 using the present invention and the waveform of the sound source model.
Figure 11:
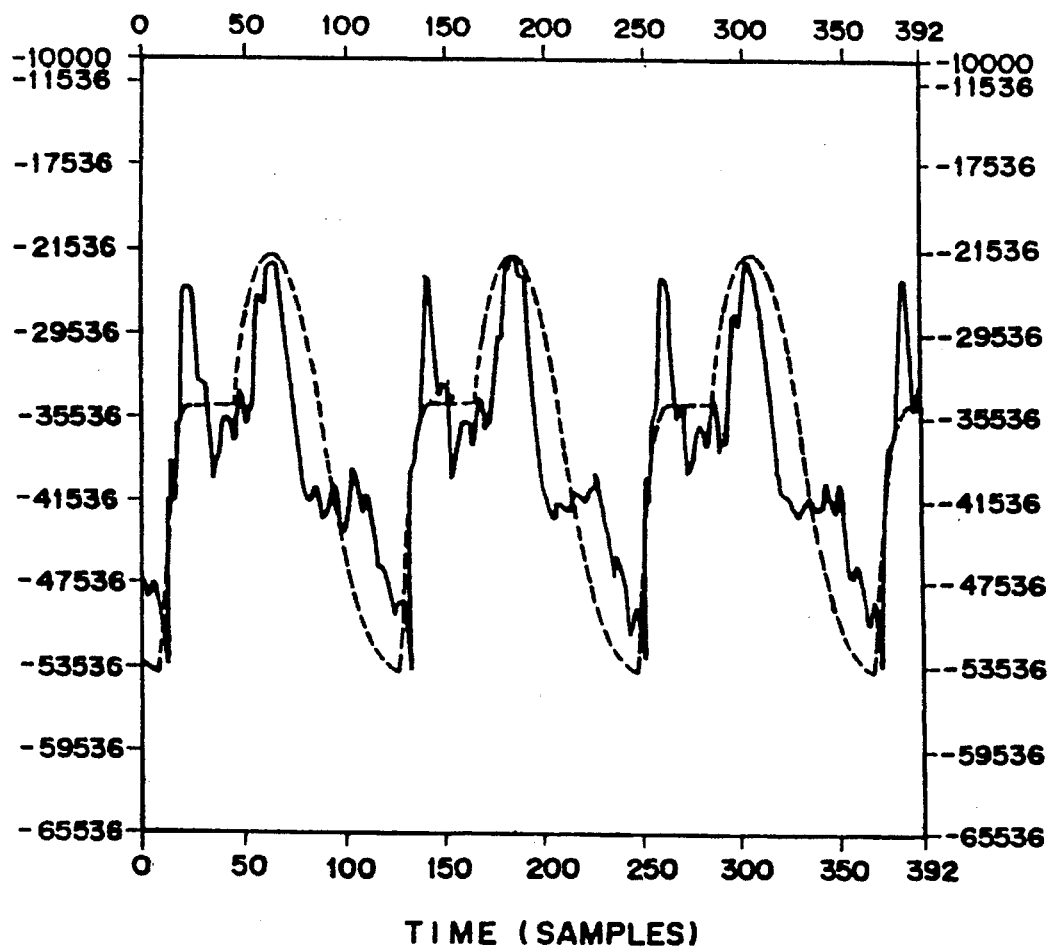
FIG. 11 is a waveform plot showing a waveform of the sound source obtained from the data of natural voice by using the prior art and the waveform of the extracted sound source model.
Figure 12:
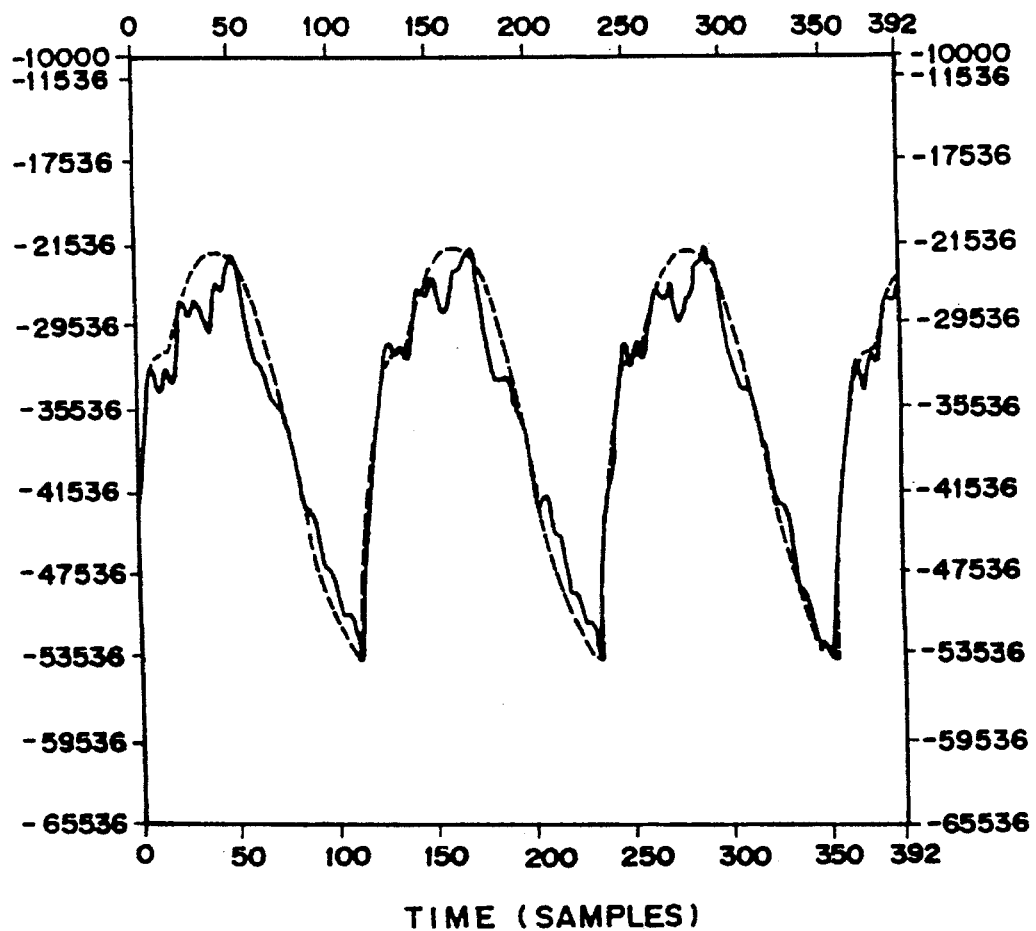
FIG. 12 is a waveform plot showing a waveform of the sound source obtained from the same natural voice data as FIG. 11 by using the present invention and the waveform of the extracted sound source model.

FIGS. 10 and 12 show examples of input signals of the circuit 316 for analyzing the source parameters by the AbS method in the time domain. FIGS. 9 and 11 show examples of input signals obtained by using the conventional AIF method. By comparing these examples, it will be understood that the waveform obtained according to the present invention is more precise than one of the prior art.

Figure 7:
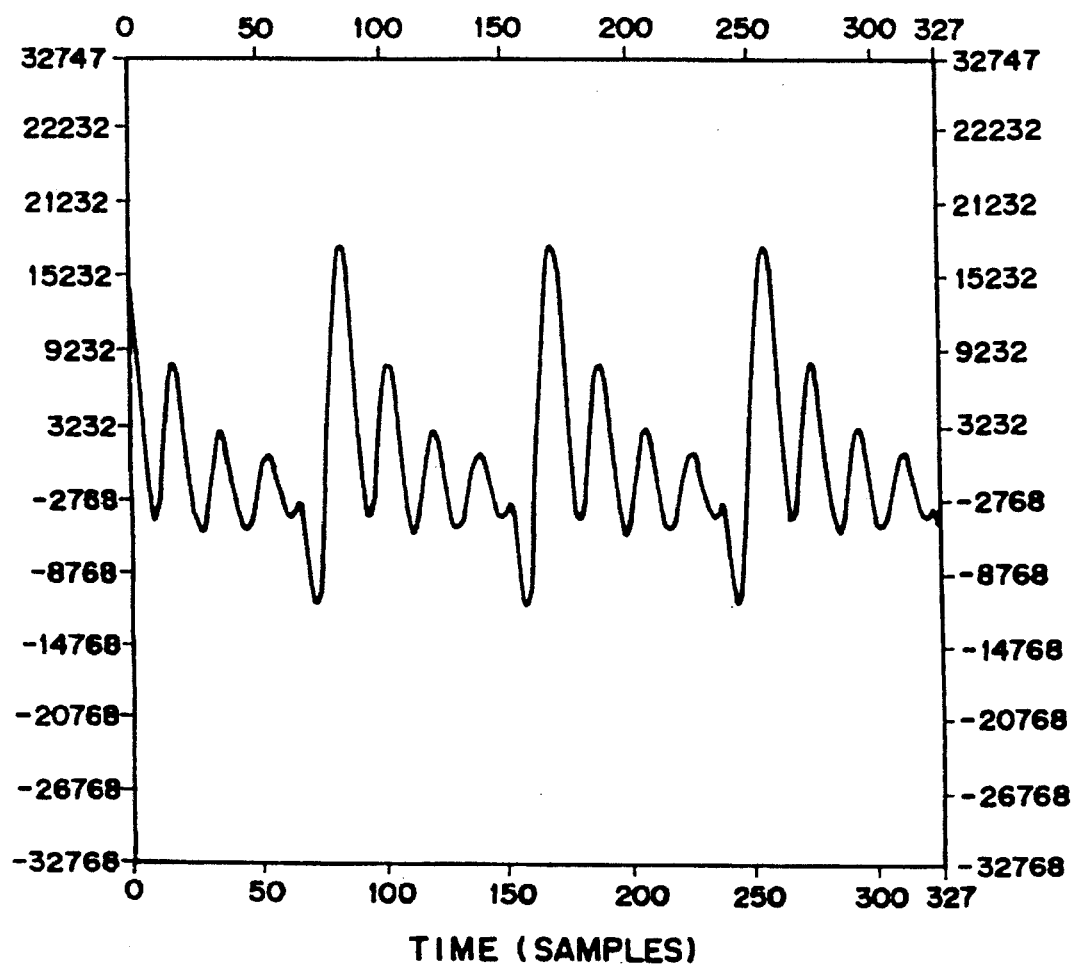
FIG. 7 is a waveform plot showing an example of a synthesized voice waveform.
Figure 8:
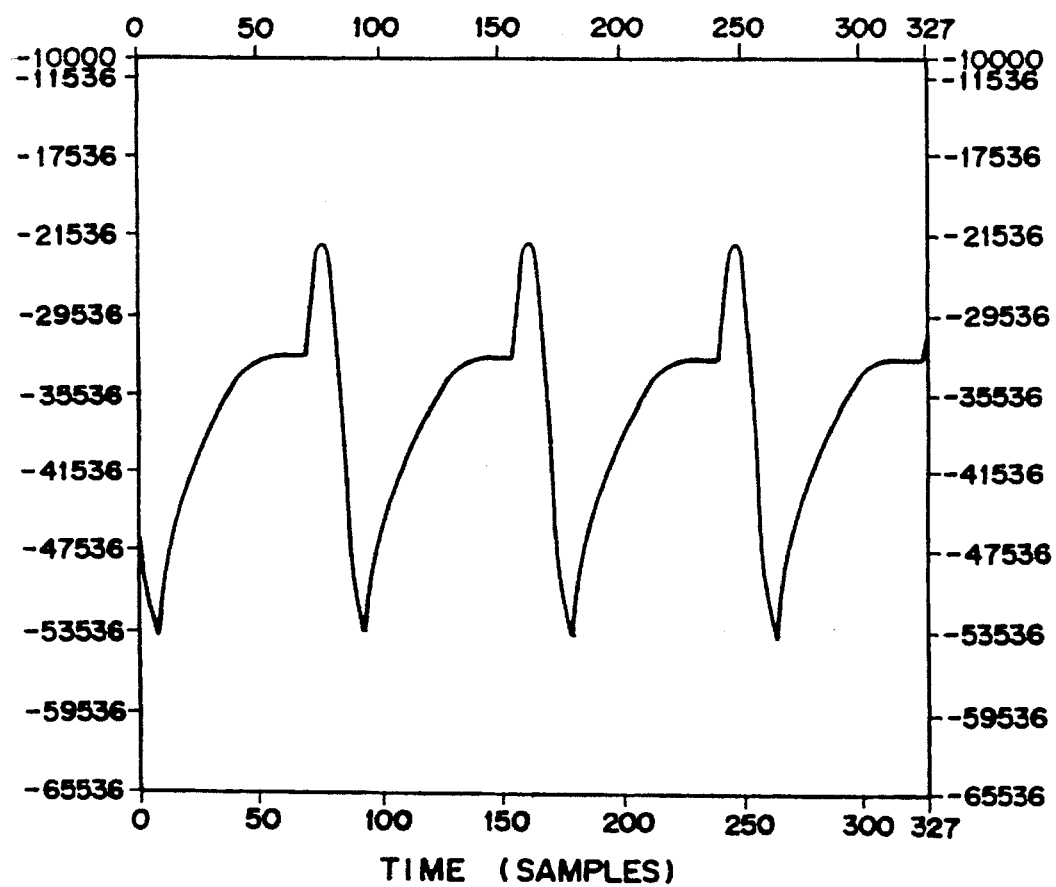
FIG. 8 is a waveform plot showing a waveform of a sound source of the synthesized voice in FIG. 7.

Here, FIG. 10 shows the waveform (solid line compare FIG. 8) of the sound source obtained from the synthesis voice data of FIG. 7 and the waveform (dotted line) of the source model. FIG. 12 shows the waveform (solid line) of the sound source obtained from the same natural voice data as was used by the prior art of FIG. 11 and the waveform (dotted line) of the source model. Furthermore, calculations in the course of each processing of the speech analyses apparatus can be carried out by controlling a general purpose computer by software. In the first embodiment, a general purpose computer (S-G33-BCX, product of Sumitomo Electric System) was used for an experiment. Each of circuits in FIGS. 5A and 5B will be explained later.

As explained hereinbefore, since the vocal tract parameters are analyzed by the means 106 for analyzing the vocal tract parameters after the effects of the sound source are eliminated by the means 104 for converting LPC coefficients to the values of poles and the means 105 for eliminating the poles which model the effect of the sound source in FIG. 4, more accurate analysis than the prior art is realized. Furthermore, since the source parameters are analyzed by the means 108 for analyzing the sound source after the effects of only the vocal tract parameters are eliminated by the means 107 for eliminating the vocal tract parameters, it is possible to analyze more precisely than by the prior art.

An embodiment of the sixth claim will be explained. In the previously described embodiments, when the analysis of the vocal tract parameters is performed, the effects of the source parameters (which is obtained by the LPC analysis) are eliminated to obtain the vocal tract parameters. Next, the source parameters are obtained by AbS-analysis (noting that this is different from the above LPC analysis) the voice signal eliminated the above vocal tract parameter from the input voice signal. On the other hand, in the embodiment of the sixth claim, the order in which the effects of the vocal tract parameters are eliminated from the input voice signal is changed to separate the effects of the source parameters and the effects of vocal tract parameters from the (voice) signal so that the sound source waveform is combined with the first formant which has a great effect on analysis of the source parameters.

Figure 13:
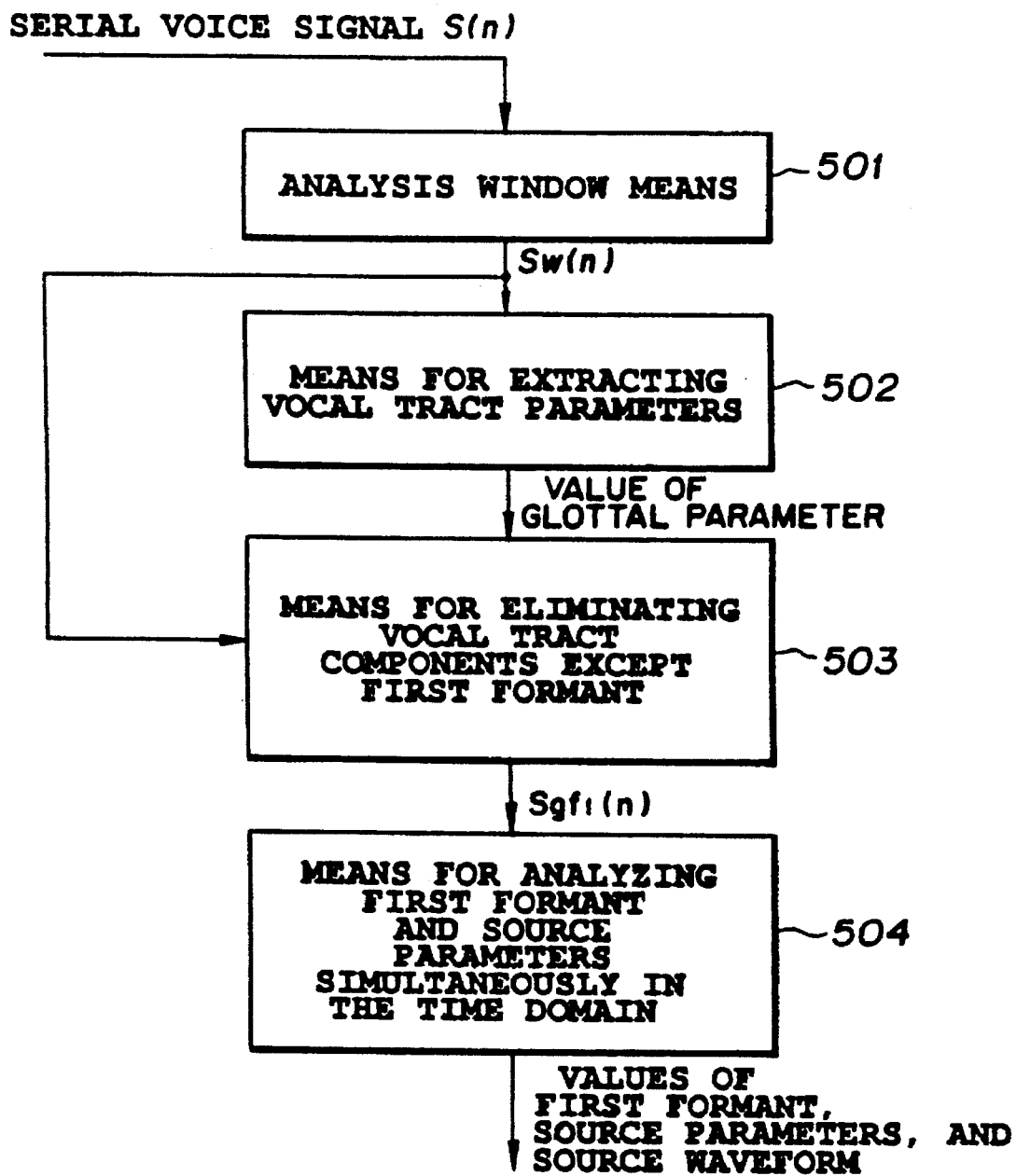
FIG. 13 is a block diagram showing a fundamental arrangement of one embodiment of the sixth claim of the present invention.

FIG. 13 shows a fundamental arrangement of the speech analysis apparatus according to the present invention.

In FIG. 13, analysis window means 501 sets the time limits with respect to serial voice signal s(n) to be analyzed, and produces a voice signal sw(n) which is a part of the signal s(n). The vocal tract parameter extracting means 502 inputs the signal s(n). The vocal tract parameter extracting means 502 inputs the signal sw(n), extracts the vocal tract parameters in the form of poles, and outputs the extracted vocal tract parameters.

A vocal tract parameter eliminating means (corresponding to eliminating means of claim 6) 503 inputs the voice signal sw(n) and the vocal tract parameters, and produces and outputs a voice signal sgfl(n) in which the components of the vocal tract parameters other than the first formant component were eliminated from the voice signal sw(n). A separating means (corresponding to a separating means of claim 6) 504 analyzes the voice signal sgfl(n), analyzes in the time domain the first formant and the source parameters, and outputs the values of the first formant and the source parameters.

Figure 14B:
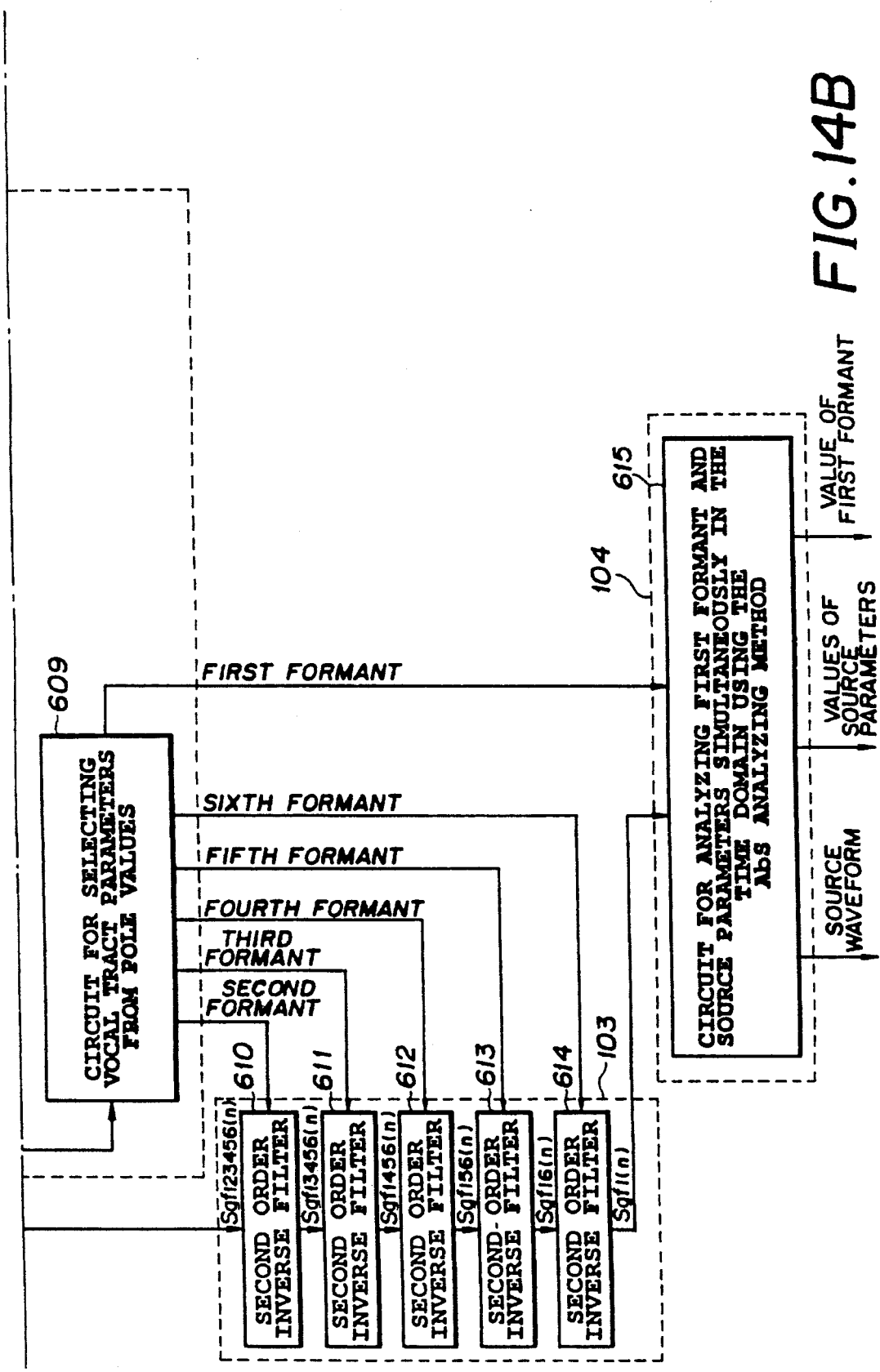
FIG. 14B is a block diagram showing another partial arrangement of the circuit according to the embodiment in FIG. 13.

FIG. 14A and 14B show a specific system arrangement. In the drawings, each part corresponding to each means shown in FIG. 13 is expressed with a dotted block. Individual circuits in FIG. 14A and 14B are described later.

In FIG. 14A, serial voice signal s(n) which is inputted in the form of 12.8 KHz sampling frequency and PCM (Pulse Code Modulation) format is passed through a phase compensation circuit (corresponding to the circuit for phase compensation of claim 12) 601, that is, the distortion produced by a recorder is compensated for to produce a voice signal sgf123456(n) whose time limits are set by a rectangular window circuit (corresponding to the circuit for extracting a voice signal with a limited time length as defined in claim 11) 602. The string of symbols such as f123456 expresses that six formants are included in the above voice signal. A circuit 603 for determining the closed period of glottis inputs a voice signal sgf123456(n), determines the closed period of glottis for the voice signal sgf123456(n), and outputs the time limits (an area of window).

A circuit 604 for eliminating the voice signal outside the closed period of the glottis (corresponding to the circuit for eliminating of claim 10) 604 inputs the time range of the closed period of the glottis, and generates a voice signal sc(n) which has data only within the closed period of the glottis from the voice signal sgf123456. A preemphasis circuit 605 inputs the voice signal sc(n), filters with 6 dB/oct the voice signal sc(n), and outputs the filtered voice signal sp(n). A Hamming window circuit 606 inputs a voice signal sp(n), and output a voice signal sh(n) which is processed by the Hamming window. LPC analysis circuit (corresponding to the circuit for extracting of claim 9) 607, inputs the voice signal sh(n) and performs an LPC analysis of the voice signal sh(n) to output LPC coefficients as result of the analysis. A circuit 608 for converting LPC coefficients into poles inputs LPC coefficients, converts the LPC coefficients to pole values, that is, two values which indicate the frequency of the pole and the bandwidth of the pole and outputs the two values obtained as a result.

In FIG. 14B, a selecting circuit 609 inputs values of poles, and selects the value of each pole which corresponds to one of the six formants on the basis of the values of bandwidths included in the values of poles. The values of the selected poles are supplied by the selecting circuit 609. This selecting circuit corresponds to a supplying means of claim 9. Furthermore, the LPC analysis circuit 607, the converting circuit 608 and the selecting circuit 609 function as means for extracting the first formant component as defined in claim 7. A second order inverse filter 610 inputs the value of the pole which is the second formant, and inverse filters the voice signal sgf123456(n) to eliminate the component of the second formant. A second order inverse filter 611 inputs the voice signal sgf13456 which is formed by eliminating the component of the second formant from the inverse filter 610, and forms the voice signal sgf1456 by eliminating the third formant component by inverse filtering using the pole which corresponds to the third formant. A second order inverse filter 612 inputs the voice signal sgf1456(n) which eliminated the third formant component, from the inverse filter 611, and forms a voice signal sgf156 in which the fourth formant component has been eliminated by performing inverse filtering using the value of pole of the fourth formant.

A second order inverse filter 613 inputs the voice signal sgf156(n) in which the fourth formant component is eliminated from the inverse filter 612, and forms a voice signal sgf16(n) in which the fifth formant component has been eliminated by performing inverse filtering using the value of the pole of the fifth formant. A second order inverse filter 614 inputs the voice signal sgf16(n) in which the fifth formant component is eliminated, from the inverse filter 613, and forms a voice signal sgfl(n) in which the sixth formant component has been eliminated by performing inverse filtering using the value of pole of the sixth formant.

An analyzing circuit 615 inputs the voice signal sgfl(n), and by the AbS method extracts the first formant component and the source parameters. Here, the AbS method is a method such that if the parameters that can represent a curve (waveform) to be analyzed are unknown, the candidate most similar to the curve to be analyzed is picked up from among a plurality of curve candidates whose parameters are known and the values of the parameters of the picked up curve candidate are determined to be the correct values. In more detail, a plurality of candidates of the first formant are made by adding/subtracting a constant value to/from the value of the first formant which is inputted from the selecting circuit 609. Further, a plurality of candidates of the source waveforms are made. The voice signal sgfl(n) is inverse filtered using the candidates of the first formant. As a result, a plurality of source waveforms are formed by eliminating the first formant candidate component from the voice signal. The error between the source waveform and the above candidates of the source waveform is calculated, and the candidate of the source waveform having the smallest error is picked up. The source parameter of the picked up candidate of the source waveform and the first formant which generated this source waveform are determined to be the result of analysis.

Figure 15:
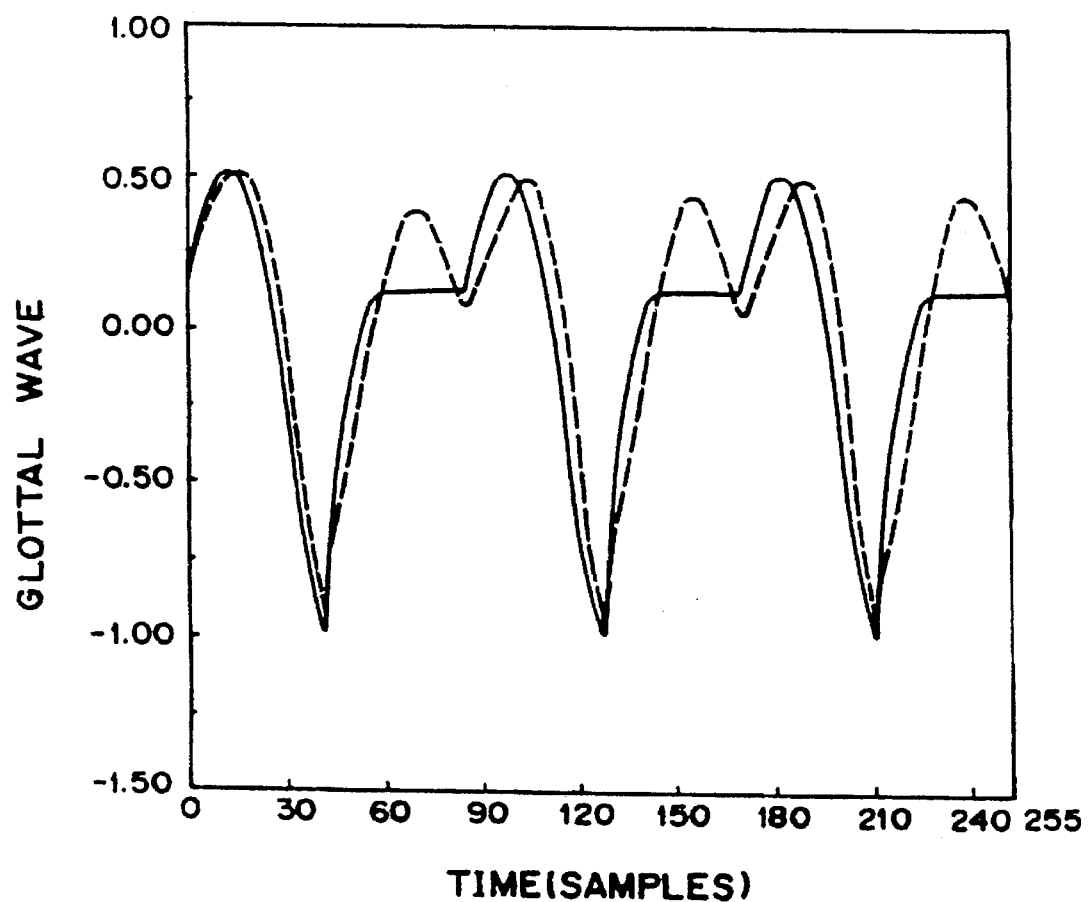
FIG. 15 is a waveform plot showing waveforms of the sound source with an error in first formant of +40 Hz and the waveform of the sound source with no error in first formant.
Figure 16:
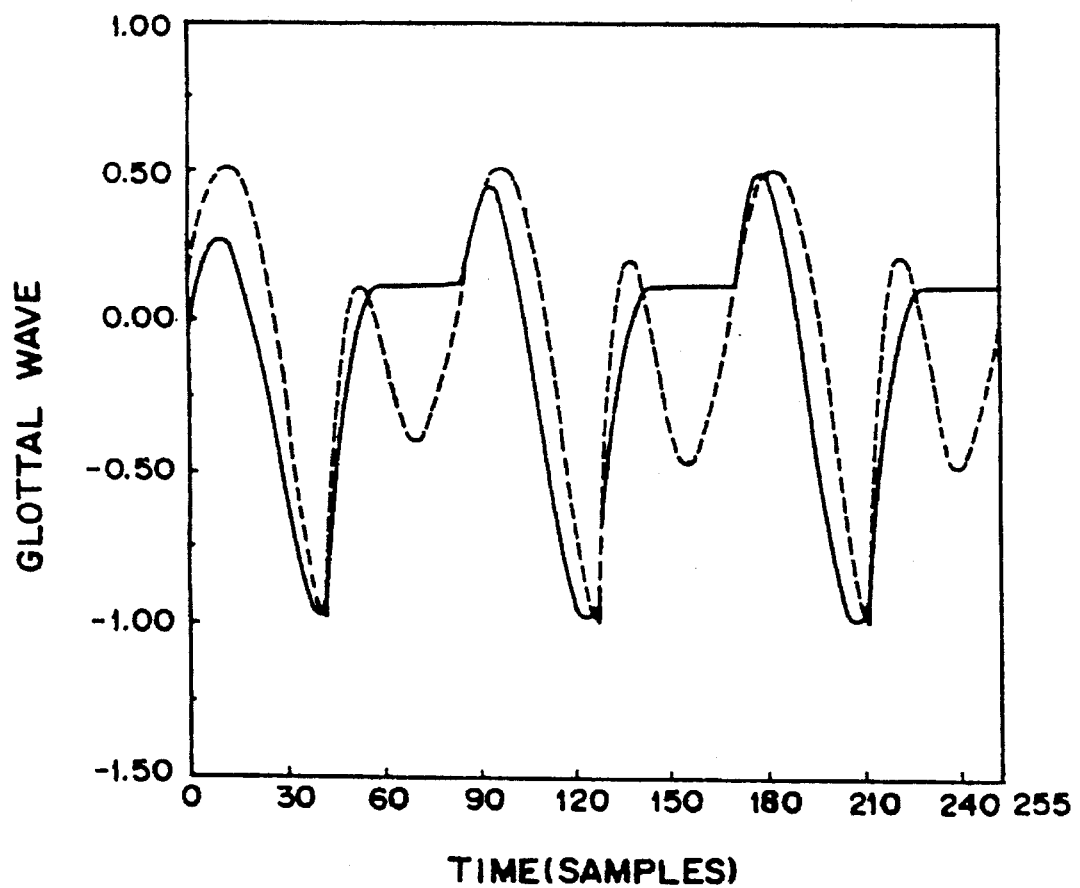
FIG. 16 is a waveform plot showing waveforms of the sound source with an error in first formant of −40 Hz and the waveform of the sound source with no error in first formant.

FIGS. 15 and 16 show a source waveform that was generated by correct inverse filtering of the first formant (solid line) and source waveforms that were generated by incorrect inverse filtering of the first formant (dotted line). In FIG. 15, the error in first formant value is 40 Hz, and in FIG. 16 the error in first formant value is −40 Hz.

Figure 17:
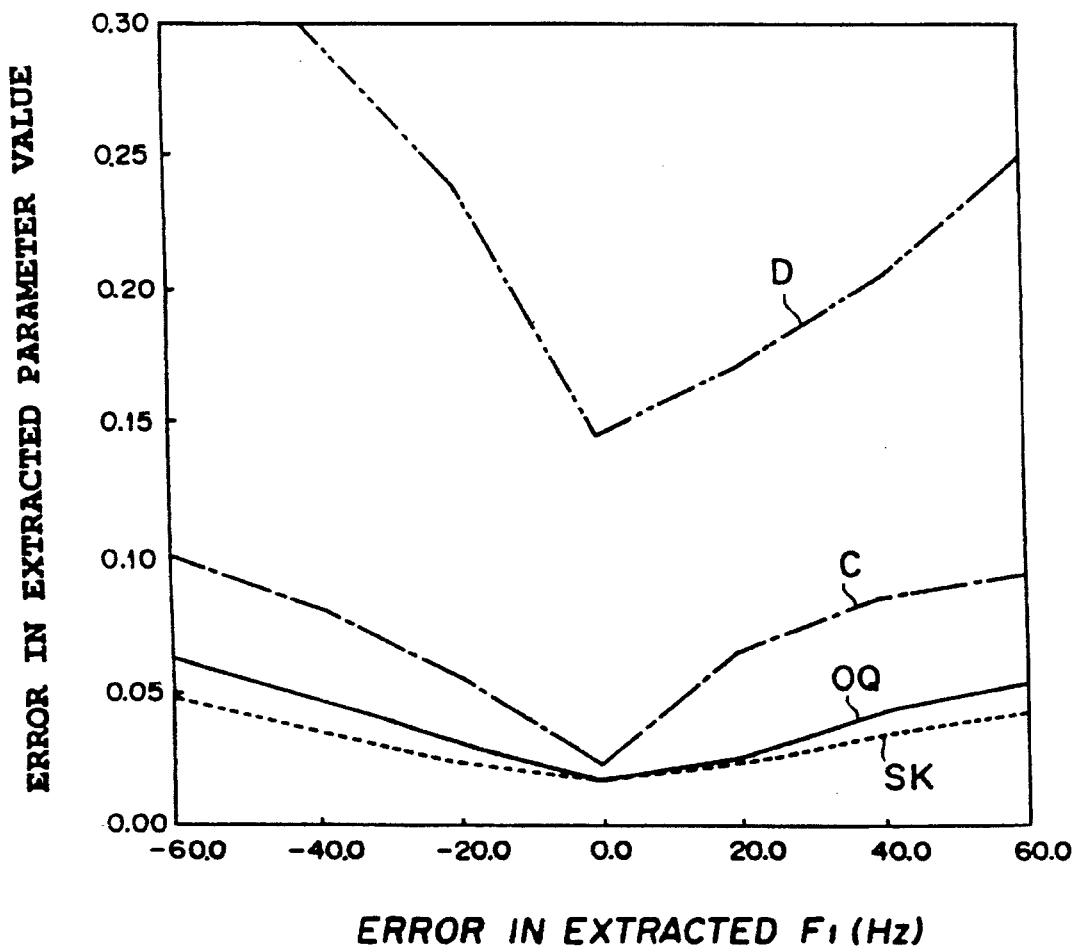
FIG. 17 is a diagram showing the relation between error in each of the source parameters and error of the first formant frequency.
Figure 18:
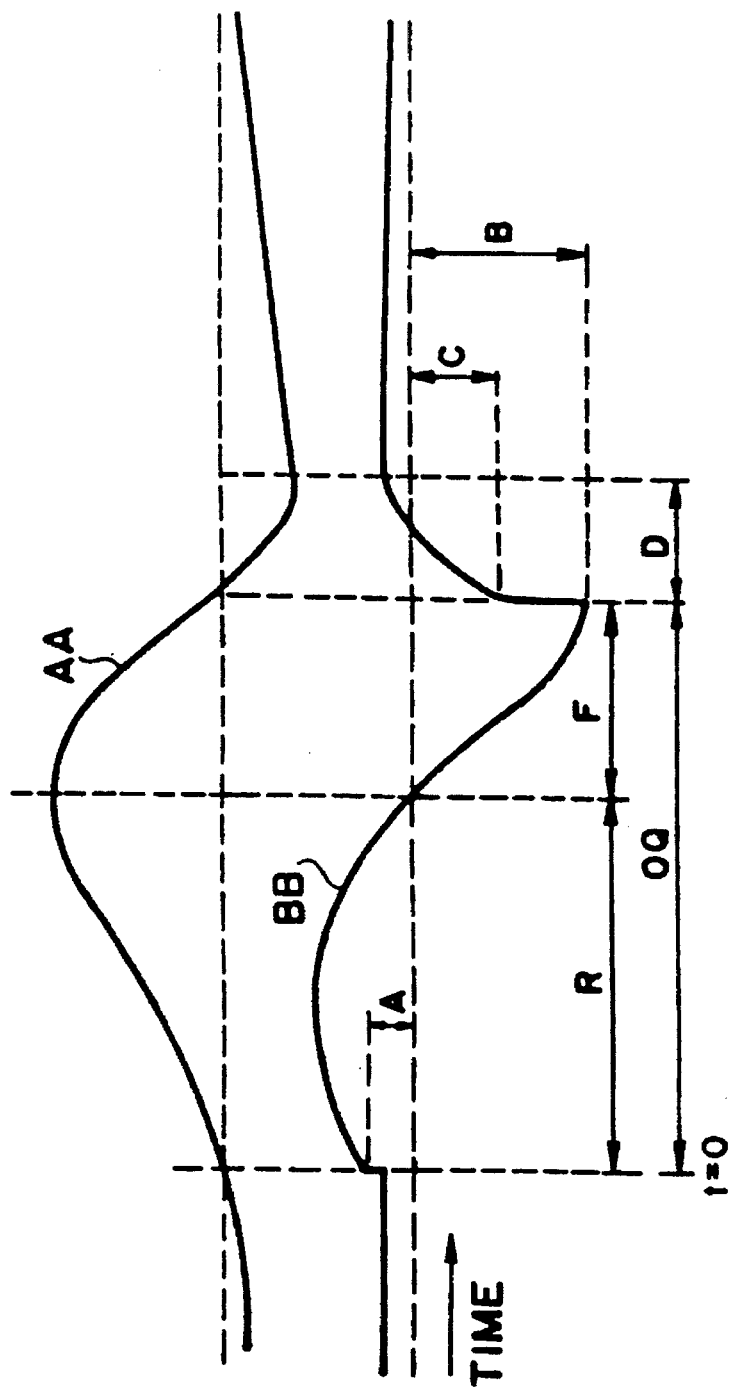
FIG. 18 is a waveform plot showing a waveform of the glottal source model and its associated parameters.

FIG. 17 shows the relationship between errors in extracted source parameters and error in the first formant. In FIG. 17 SK is a parameter which shows the distortion in the open period of the waveform of the glottal source; OQ is a parameter of the amount of open time of the waveform of the glottal source; C is a parameter which sets the value of glottal flow derivative at the instant of glottal closure; and D is a parameter which shows the glottal closure timing. The relationship between these parameters and the waveform of the glottal source is shown in FIG. 18. In FIG. 18 AA designates the waveform of the glottal source (glottal flow), and BB designates the waveform of glottal flow derivative. Furthermore, OQ=(R+F), and SK=(R−F)/(R+F).

FIGS. 19 to 21 show the values of the first formant and the glottal parameters, of a synthetic voice and the results of analysis of the synthetic voice by the prior art and the present invention and the respective errors. It can be seen from these figures that the precision of analysis of the present invention is superior to that of the prior art.

Each circuit in FIGS. 5A, 5B, 14A, and 14B will be explained hereinafter, where, the description of the circuits known well in the field of not only speech processing but also signal processing, e.g. inverse filtering will be abbreviated. The circuits in the drawings which re common will be also abbreviated in their description.

The circuits in FIGS. 14A and 14B can be arranged by software in the first and the second embodiments, since a general purpose computer (S-G333-BCX, made by Sumitomo Electric Systems) can be used as a speech analysis apparatus. Flowcharts of processing of the main circuits are shown in FIGS. 22 to 28. For the convenience of explanation, contents of processing in the flowcharts are used functional expression rather than the program language for operating the computer.

A digital filter is used for a phase compensation circuit 601 and the digital filter is given characteristics which are opposite to the signal transmission characteristics of the recorder measured by a measuring device. Rectangular window circuits 301, 401 and 602 extract respectively the voice signal within a limited period of time from the input voice signal by multiplying the input voice signal by the following window function which defines a rectangular window.

$$W(n)=1 \quad 0 \leq n \leq N-1$$

where 0 to N−1 express width of time of the extraction.

Figure 22:
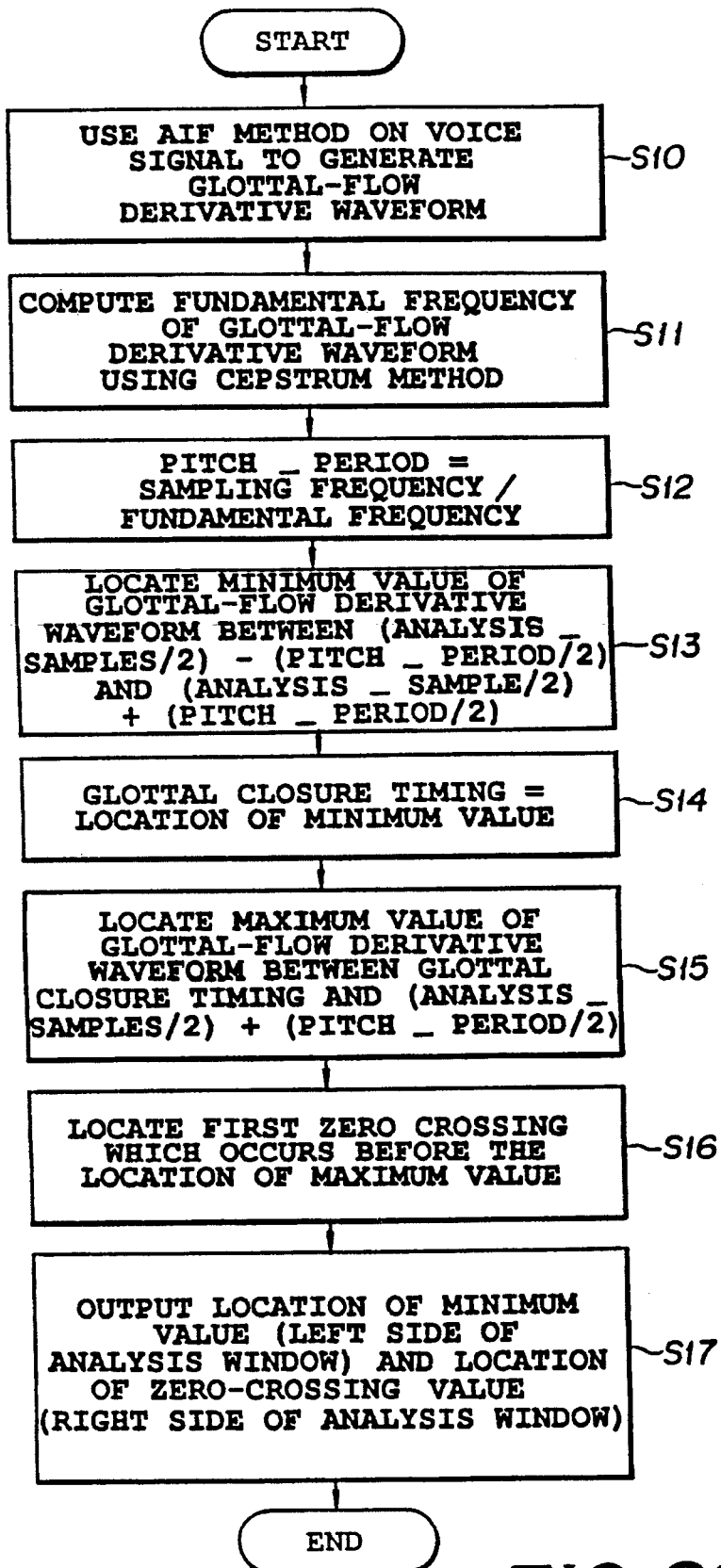
FIG. 22 is a flowchart showing processing of a circuit 605 for determining a closed glottal period.

A preemphasis circuit 605 emphasizes the high-frequency portions, namely, it compensates for the average declination of the spectrum of the input waveform, thus removing the concentration of energy in the low-frequency region. In this embodiment, the value of difference between the adjacent digital values $x_t$ and $x_{t-1}$ which show the input voice is an output value at a time t. FIG. 22 shows the procedure of the circuit 603 for determining the glottal closure period. In this embodiment, the derivative waveform gd(n), its fundamental frequency and pitch period are obtained from the input voice waveform sw(n) (steps S10 to S12). The glottal closure time point (left side of the window which defines the glottal closure period) is determined from the minimum value of gd(n) in the range defined by the pitch period (steps S13 to S14). Furthermore, the first zero crossing time point of gd(n) which follows the glottal closure time point and is in the above range is defined as the right side of the window which defines the glottal closure period (steps S15 to S17). The information which are determined in such a manner and showing the width of the window during the glottal closure period and are supplied to the window circuit 604 for eliminating signals outside the glottal closure period. Hamming window circuits 303, 306, 403, 406 and 606 extract the waveforms within a limited period of time by multiplying the voice waveform by the Hamming window function expressed by the following equation.

$$W(n) = 0.54 - 0.46\cos\left(2\pi \frac{n}{N-1}\right) \quad 0 \le n \le N-1$$

In LPC analysis circuits 307, 407 and 607, the voice waveform is approximated as follows.

$$Y_n = \alpha 1 Y_{n-1} + \alpha 2 Y_{n-2} + \qquad \alpha p Y_{n-p}$$

where, $Y_n$ is the sampled value of the voice waveform at a time n, and $Y_{n-1}$ to $Y_{n-p}$ are sampled values between time n−1 and n−p.

The coefficients $\alpha 1$ to $\alpha p$ which satisfy the above equation (which are called the LPC coefficients) can be calculated by using the sampled value of the voice waveform. Because there are many methods of solving the above equation, one method among these solving methods will be used. The LPC coefficients $\alpha 1$ to $\alpha p$ are outputted from the LPC circuit as a result of the LPC analysis.

Circuits 308, 408 and 608 for converting the LPC coefficients into the value of poles perform the conversion in accordance with the following equation. That is, roots Zi (i=1, 2 ... p) of $Z^p + \alpha 1 Z^{p-1} + \alpha 2 Z^{p-2} \ldots + \alpha_{p-1}Z + \alpha_p = 0$, become poles.

The central frequency fi and the bandwidth bi of the poles are obtained by the following equation:

$$fi = \frac{\omega i}{2\pi} = \frac{1}{2\pi} \cdot \frac{1}{T} \arg(Zi)$$

$$bi = \frac{1}{\pi} \cdot \frac{1}{T} |\log ri|$$

where, T is a sampling period, and ri is a constant which depends on the complex root Zi.

Figure 23:
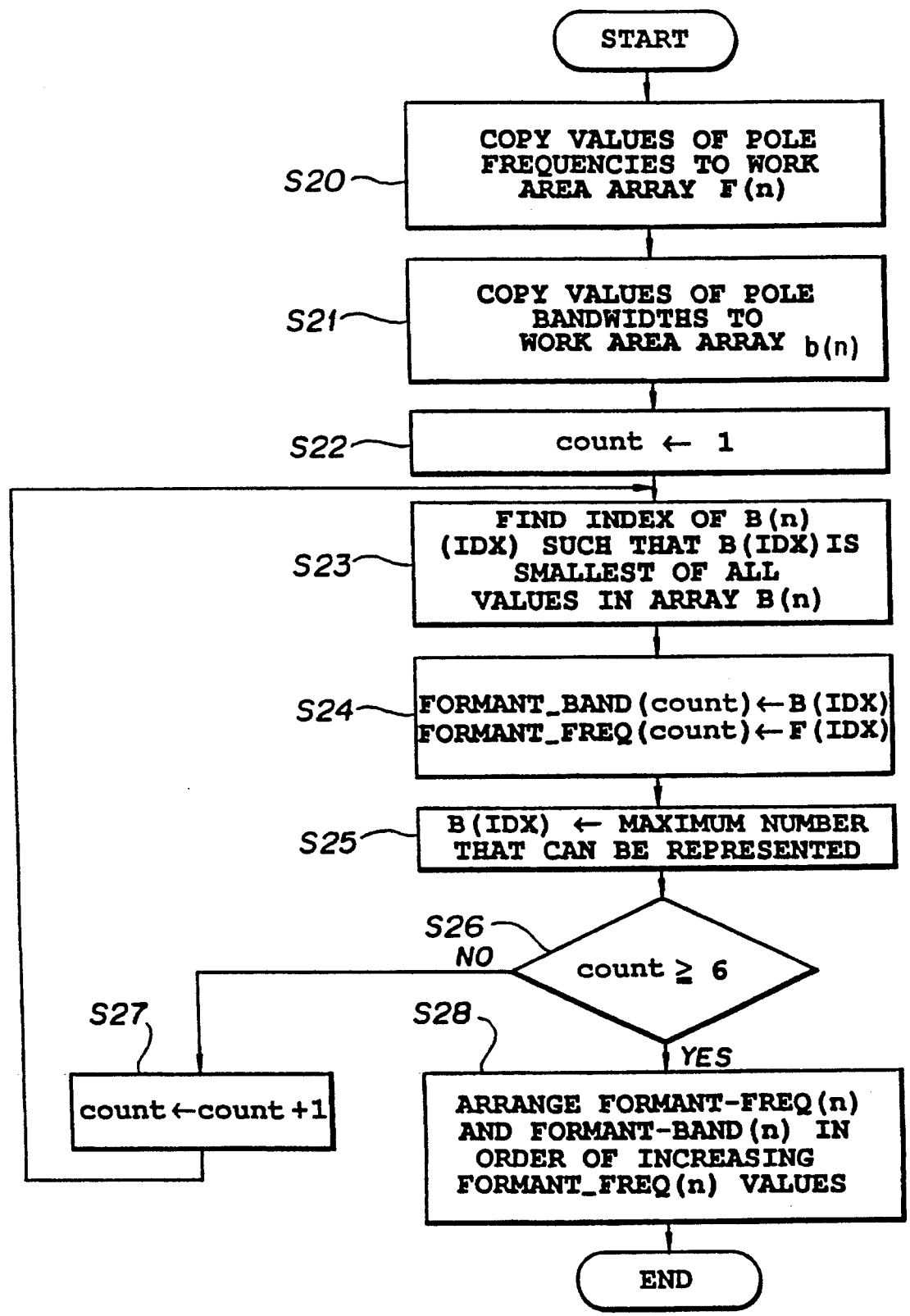
FIG. 23 is a flowchart showing processing of a selecting circuit 609 of FIG. 14B.

FIG. 23 shows the procedure of the circuit 609 for selecting the vocal tract parameters from values of poles. A plurality of sets of values of pole frequencies and bandwidths, (in this embodiment, more than six sets of the values of frequencies and bandwidth) are stored in the work area of the general purpose computer (steps S20 to S21).

First, the six sets of data groups whose bandwidth is the smallest among the plurality of data, is detected by a CPU (Central Processing Unit) (the loop processing from step S23 to step S26). Second, the six sets of the detected data groups are sorted in order of increasing frequency (step S28), where the smallest frequency is the first formant frequency.

Figure 24:
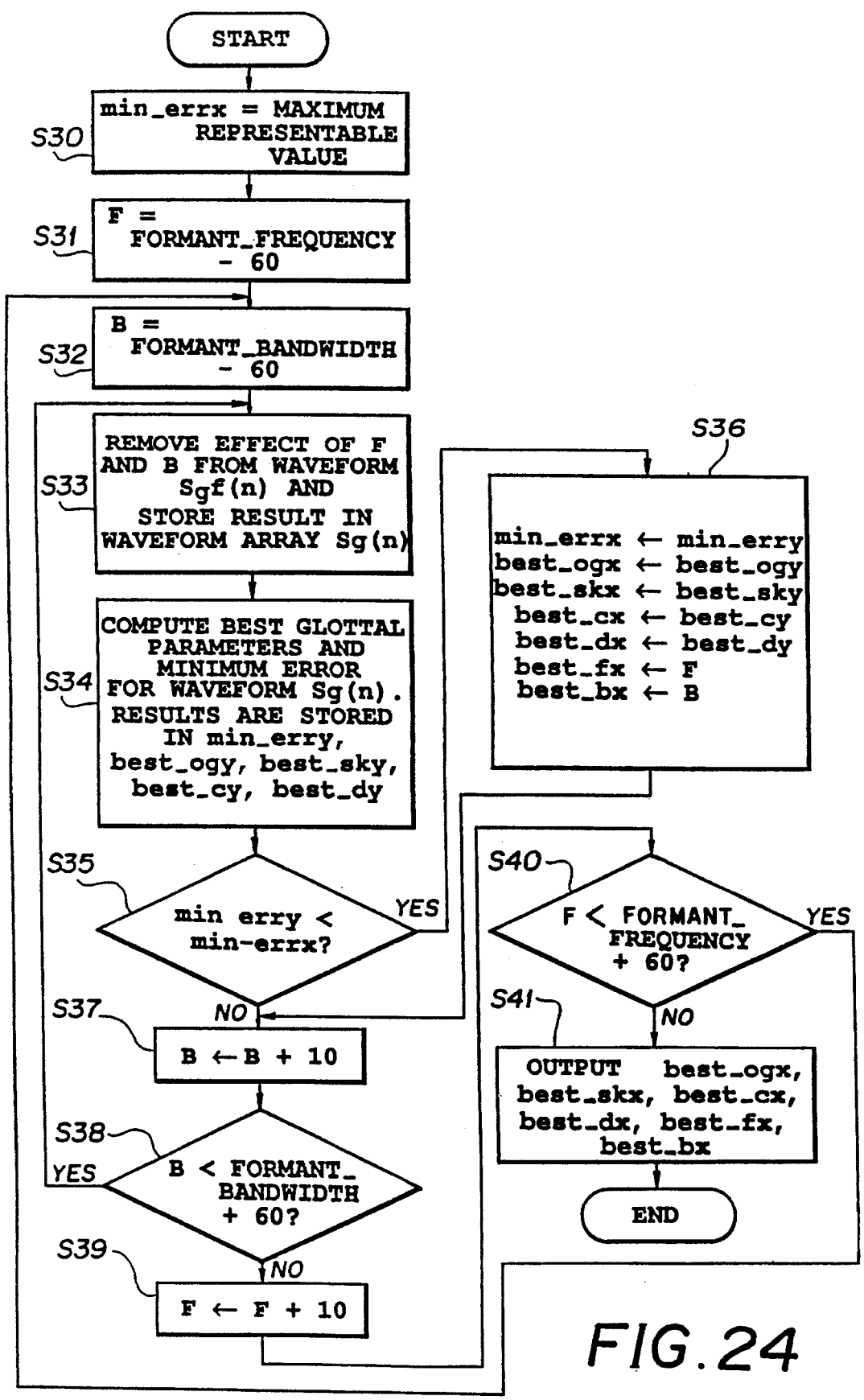
FIG. 24 is a flowchart showing processing of an analysis circuit 615 of FIG. 14B.
Figure 25:
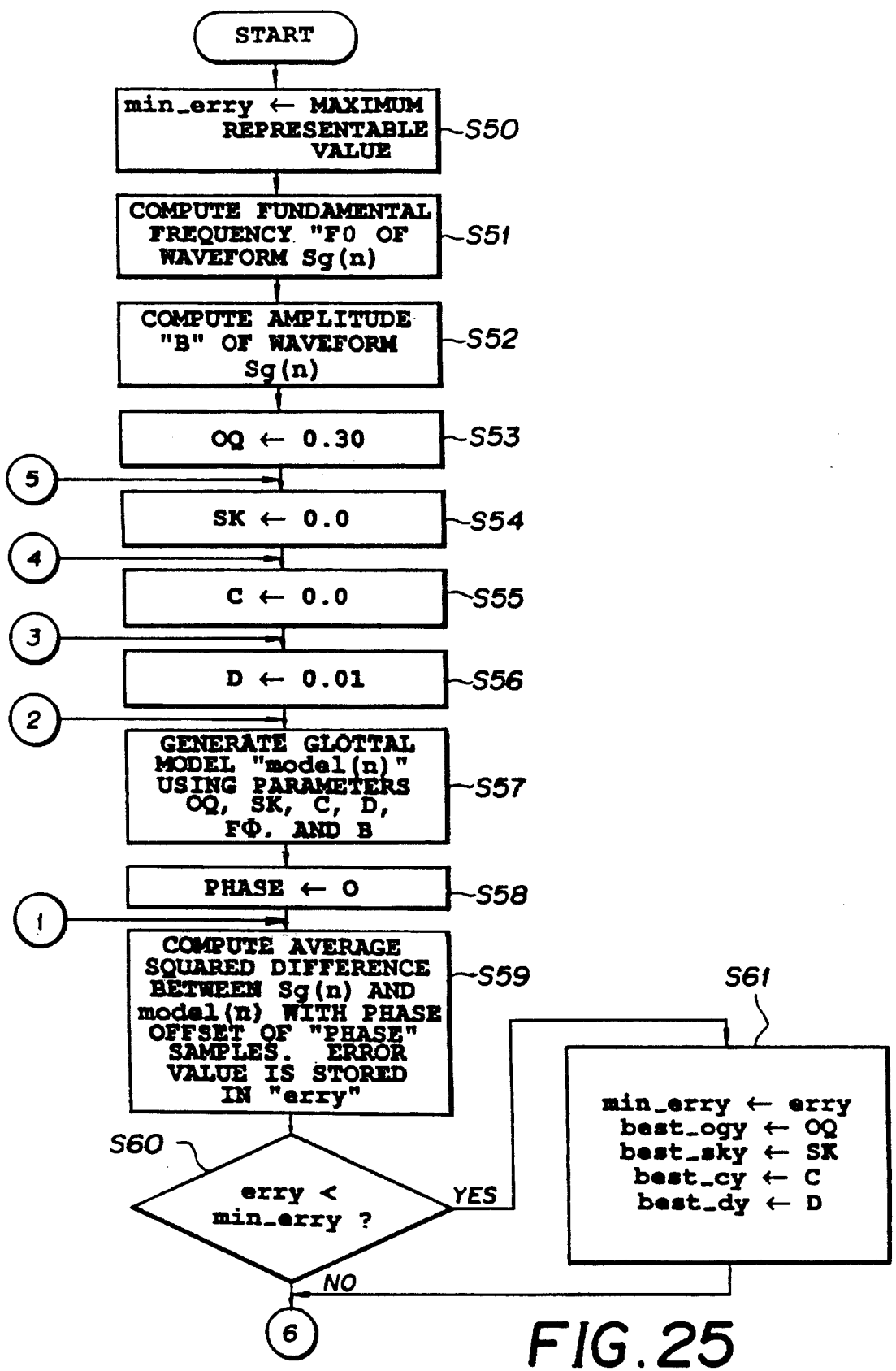
FIGS. 25 and 26 are flowcharts each showing the detailed procedure at S34 in FIG. 24.
Figure 26:
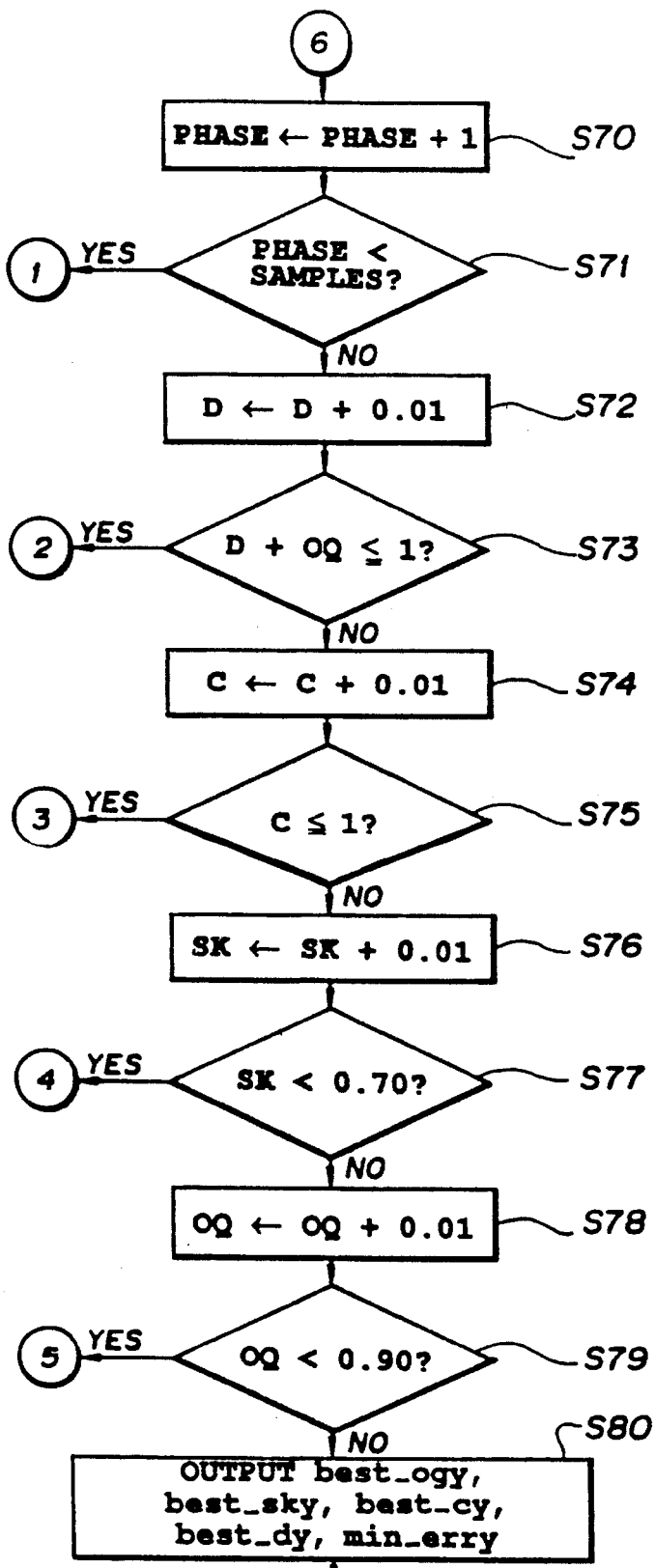

FIGS. 24 to 26 show the procedure of the analyzing circuit 615. Where FIG. 24 shows the main procedure, and FIGS. 25 and 26 show detailed procedures of step S34 in FIG. 24. In FIG. 24, the values of the initial candidate of the first formant are set to be the same as the first formant component (frequency, bandwidth) which is inputted from the selecting circuit 609 (steps S30 to S32). Next the effect of the candidate formant is removed by the inverse filter processing from the waveform sgfl which includes the first formant component and the source waveform sg(n) is produced (step S33).

Next, the error is calculated between the source waveform sg(n) and the waveform generated by the source parameter candidates (step S34).

In a manner similar to the above method, other candidates, for the first formant component are generated (steps S37 and S39). Furthermore, other candidates for the source parameter are generated (FIG. 26). Then, the error between the source waveform sg(n) to be analyzed and the waveform generated by candidates of the source parameter is calculated. The minimum error among the calculated errors, the candidates of the source parameters and the candidate of the first formant at that time are detected by the processings at steps S35 and S36. Then, the bandwidth of the candidate of the first formant component is changed in the loop process at steps S37 to S38. The frequency of the candidate of the first formant component is changed in the loop process at steps S39 to S40. In such a way, the detected source parameter with the minimum detected error (component state) and the candidate of the first formant component corresponding to the minimum error are outputted as a result of analysis of the source waveform sg(n) to be analyzed (step S41).

The process flow shown in FIGS. 25 and 26 will be explained briefly. Steps S50 to S52 are for initial processing. Steps S53 to S56 are steps for setting a plurality of candidates for source parameter values. Step S57 is a step for making candidates of the source waveform using the set candidates of the parameter values. Steps S58 to S59 are processings for setting the phase difference between the waveform sg(n) and the candidate waveform. Steps S60 and S61 are steps for finding out the minimum error when the candidates of the first formant component are fixed. Step S80 is a step for outputting the value of the source parameter component corresponding to the minimum error.

The above processing corresponds to the example in which the AbS method is applied to the analysis of both first formant and source parameters when the effect of the first formant is included in the data being analyzed.

The processing such that the candidate most similar to the waveform to be analyzed is extracted from the candidates of the source waveform formed from the source parameters, and the source parameters corresponding to the extracted candidate are outputted, that is, the AbS analysis of the source parameters, corresponds to the analyzing process in the glottal parameter analyzing circuit 313.

Figure 27:
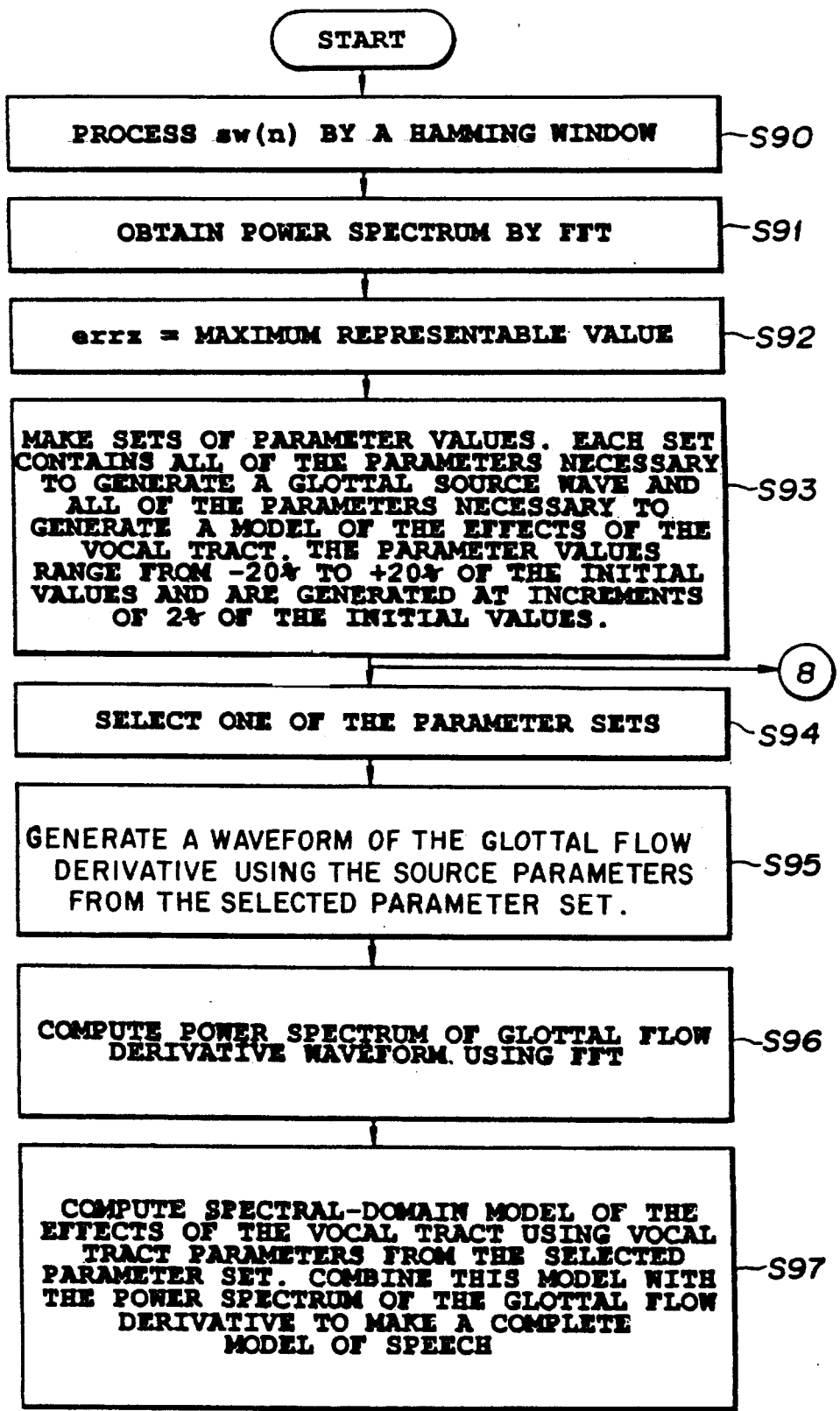
FIGS. 27 and 28 are flowcharts each showing processing of an adjusting circuit 317 in FIG. 5B.
Figure 28:
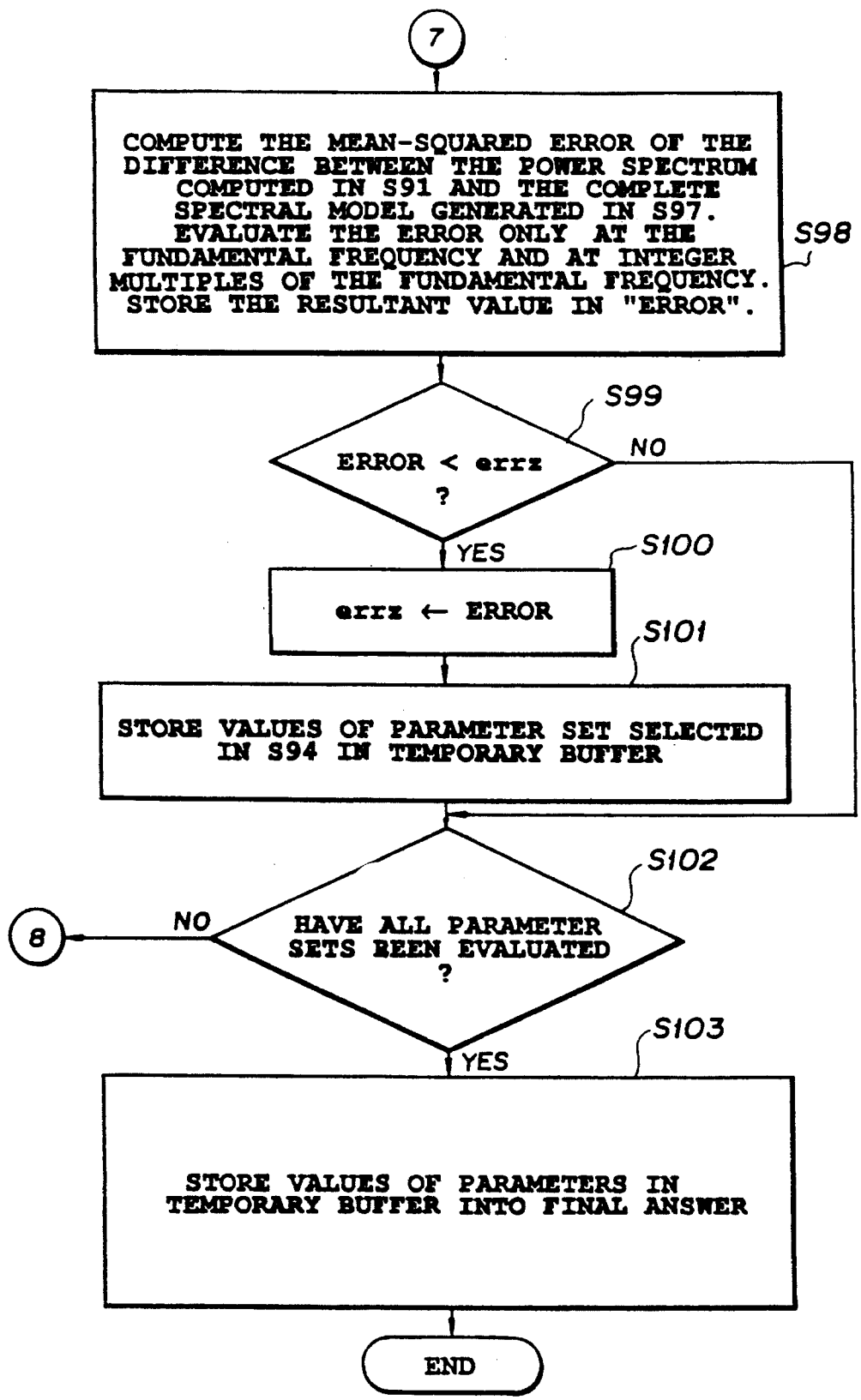

FIGS. 27 and 28 show a procedure of the adjusting circuit 317 shown in FIG. 5B. This procedure shows a process flow for correcting the vocal tract parameter values which are outputted from the vocal tract parameter analyzing circuit 317 and for correcting the source parameter values which are outputted from the source parameter analyzing circuit 316 by using the AbS method. In more detail, the waveform in a specified period of the voice waveform sw(n) to be analyzed is picked up, and then the power spectrum of the waveform is obtained by the calculation of the Fast Fourier Transformation (FFT) (steps S90 to S91). Next, a plurality of candidates for the vocal tract parameters are made from the vocal tract parameters which are outputted from the vocal tract parameter analyzing circuit 317. Further, a plurality of candidates for the source parameters are made from the source parameters which are outputted from the analyzing source parameter circuit 316, (step S93). The waveform of the glottal source is formed by using the source parameters (step S95). Next, the power spectrum of the formed glottal source waveform is calculated, and then the source power spectrum of the speech is calculated by multiplying the source power spectrum by the gain resulting from the effect of the vocal tract (which is determined from the candidates of the vocal tract parameter) (step S97).

The error between the power spectrum obtained at step S91 and that obtained at step S97, i.e. the error at each frequency which is an integer multiple of the fundamental frequency is calculated (step S98). By the loop processes from steps S102 to S94, the candidates of the vocal tract parameters and the source parameter are renewed to detect the candidates of the vocal tract parameters and the source parameter with the minimum error. The detected candidates of the vocal tract parameters and the source parameter are outputted as the result of adjustment.

In these embodiments, the circuits were realized on a general purpose computer, the above circuits can be implemented by analog circuits, digital circuits and other circuits having functions described in the embodiments.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A speech analysis apparatus for extracting glottal source parameters and formant parameters wherein components of a vocal tract parameter and source parameters are extracted from a voice waveform, said apparatus comprising:

an eliminating circuit for eliminating formant components except a first formant component from a plurality of formant components which form the components of said vocal tract parameter; and a separating circuit for separating said source parameters and said first formant component using voice signal after said eliminating processing;

wherein said separating circuit comprises:

a circuit for extracting directly said first formant component from said voice waveform;

a circuit for making a plurality of candidates of the first formant by using said extracted first formant component, each of the candidates having different values;

a circuit for eliminating each of the candidates of said first formant from the voice signal after said eliminating processing;

a generator for generating a plurality of candidates of the source waveform whose source parameters are apparent;

a detector for detecting from the source waveforms candidates generated a candidate of the waveform most similar to the waveform of the voice signal from which said candidate of the first formant is eliminated; and a circuit for determining as a result of said circuit for separating the candidates of the first formant and the source parameter corresponding to said detected candidate of the source waveform.

2. A speech analysis apparatus for extracting glottal source parameters and formant parameters according to claim 1, further comprising:

a circuit for extracting a plurality of formant components which form said component of the vocal tract parameters from said voice waveform, wherein said circuit for extracting supplies the first formant component among the plurality of the extracted formant components to said circuit for separating, and supplies the formant components except said first formant component to said circuit for eliminating.

* * * * *